(12) United States Patent
Maeguchi et al.

(10) Patent No.: US 10,376,942 B2
(45) Date of Patent: Aug. 13, 2019

(54) WATER JET PEENING DEVICE

(71) Applicant: MITSUBISHI HEAVY INDUSTRIES, LTD., Tokyo (JP)

(72) Inventors: Takaharu Maeguchi, Tokyo (JP); Yuichiro Nomura, Tokyo (JP); Kazuya Tsutsumi, Tokyo (JP); Nobuyuki Hori, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 450 days.

(21) Appl. No.: 15/121,262

(22) PCT Filed: Jan. 16, 2015

(86) PCT No.: PCT/JP2015/051095
§ 371 (c)(1),
(2) Date: Aug. 24, 2016

(87) PCT Pub. No.: WO2015/146232
PCT Pub. Date: Oct. 1, 2015

(65) Prior Publication Data
US 2016/0361746 A1 Dec. 15, 2016

(30) Foreign Application Priority Data
Mar. 26, 2014 (JP) .................. 2014-064866

(51) Int. Cl.
*C21D 7/06* (2006.01)
*B21D 31/06* (2006.01)
(Continued)

(52) U.S. Cl.
CPC .............. *B21D 31/06* (2013.01); *C21D 7/04* (2013.01); *C21D 7/06* (2013.01); *C21D 9/08* (2013.01);
(Continued)

(58) Field of Classification Search
CPC . B21D 31/06; C21D 7/04; C21D 7/06; C21D 9/50; C21D 9/08; G21C 17/003; G21C 21/00
(Continued)

(56) References Cited

U.S. PATENT DOCUMENTS 6,558,749 B2   5/2003   Braendle
9,324,463 B2 *  4/2016   Soda ................. G21C 17/003
(Continued)

FOREIGN PATENT DOCUMENTS

EP   1 170 387 A1   1/2002
JP   5-84452 A      4/1993
(Continued)

OTHER PUBLICATIONS

International Search Report dated Apr. 14, 2015, issued in counterpart International Application No. PCT/JP2015/051095 (2 pages).
(Continued)

*Primary Examiner* — David B Jones
(74) *Attorney, Agent, or Firm* — Westerman, Hattori, Daniels & Adrian, LLP

(57) ABSTRACT

A water jet peening device includes a sealed vessel provided to cover a surface of a welded portion, and adapted to be in a sealed state where an internal pressure is higher than an outside, a jet nozzle adapted to jet high-pressure water to create a cavitation bubble toward the surface of the welded portion, inside the sealed vessel, and a pressure control hole adapted to be able to adjust the internal pressure of the sealed vessel. The water jet peening device can efficiently reform a tensile residual stress on the surface of the welded portion to a compressive residual stress.

10 Claims, 12 Drawing Sheets

(51) Int. Cl.
  *G21C 21/00* (2006.01)
  *C21D 9/08* (2006.01)
  *G21C 17/003* (2006.01)
  *C21D 7/04* (2006.01)
  *C21D 9/50* (2006.01)

(52) U.S. Cl.
  CPC ............ *C21D 9/50* (2013.01); *G21C 17/003* (2013.01); *G21C 21/00* (2013.01)

(58) Field of Classification Search
  USPC .......................................................... 72/56
  See application file for complete search history.

(56) References Cited

U.S. PATENT DOCUMENTS

| | | | |
|---|---|---|---|
| 2009/0166338 A1* | 7/2009 | Sato .................... | B23K 9/0061 219/76.1 |
| 2010/0255759 A1 | 10/2010 | Ohashi et al. | |
| 2013/0195236 A1* | 8/2013 | Soda .................... | G21C 17/003 376/249 |

FOREIGN PATENT DOCUMENTS

| | | |
|---|---|---|
| JP | 7-328858 A | 12/1995 |
| JP | 8-336755 A | 12/1996 |
| JP | 9-136261 A | 5/1997 |
| JP | 10-76407 A | 3/1998 |
| JP | 10-76467 A | 3/1998 |
| JP | 10-268080 A | 10/1998 |
| JP | 2007-185600 A | 7/2007 |
| JP | 2009-72859 A | 4/2009 |
| JP | 2011-25344 A | 2/2011 |
| WO | 2009/031517 A1 | 3/2009 |

OTHER PUBLICATIONS

Written Opinion of the International Search Authority dated Apr. 14, 2015, issued in counterpart International Application No. PCT/JP2015/051095 (7 pages).

English Translation of Written Opinion of the International Search Authority dated Apr. 14, 2015, issued in counterpart International Application No. PCT/JP2015/051095 (11 pages).

Partial European Search Report dated Oct. 12, 2017, issued in counterpart European Application No. 15768630.4. (10 pages).

* cited by examiner

WATER JET PEENING DEVICE

FIELD

The present invention relates to a water jet peening device that jets a fluid such as water toward a surface to be executed to reform the surface to be executed.

BACKGROUND

Conventionally, there is water jet peening for reforming a tensile residual stress generated in a welded portion to a compressive residual stress. The water jet peening jets, under water, high-pressure water to create cavitation bubbles caused by cavitation toward a surface of the welded portion to provide the surface of the welded portion with an impact pressure due to collapse of the cavitation bubbles, thereby to reform the tensile residual stress on the surface of the welded portion to the compressive residual stress. A device (water jet peening device) that performs such water jet peening is provided with a jet nozzle for jetting the high-pressure water. Water jet peening devices provided with a jet nozzle are described in Patent Literatures 1 to 5 below.

CITATION LIST

Patent Literatures

Patent Literature 1: Japanese Patent Application Laid-open No. 5-84452
Patent Literature 2: Japanese Patent Application Laid-open No. 7-328858
Patent Literature 3: Japanese Patent Application Laid-open No. 10-268080
Patent Literature 4: Japanese Patent Application Laid-open No. 10-76467
Patent Literature 5: Japanese Patent Application Laid-open No. 2007-185600

SUMMARY

Technical Problem

By the way, the impact pressure to be provided to the surface to be executed by the high-pressure water jetted through the jet nozzle becomes larger as a pressure difference between a pressure of an atmosphere around the jetted high-pressure water (hereinafter, referred to as atmospheric pressure) and a pressure inside the cavitation bubbles generated in the high-pressure water (hereinafter, referred to as cavitation bubble internal pressure) is larger. To be specific, the larger the atmospheric pressure and the smaller the cavitation bubble internal pressure, the larger the impact pressure.

Here, to make the impact pressure large, which is to be provided to the surface to be executed, by a jet flow through the jet nozzle, making a dynamic pressure of the high-pressure water jetted through the jet nozzle large can be considered. To make the dynamic pressure of the high-pressure water jetted through the jet nozzle large, a flow velocity of the high-pressure water jetted through the jet nozzle is speeded up. However, there are limitations to make the dynamic pressure large only with the jet nozzle. That is, it is difficult to increase the flow velocity to a critical velocity or more. Therefore, it is difficult to improve the impact pressure.

Therefore, an objective of the present invention is to provide a water jet peening device that can efficiently reform the tensile residual stress on the surface to be executed to the compressive residual stress.

Solution to Problem

In one aspect, there is provided a water jet peening device comprising: a sealed vessel provided to cover a surface to be executed, and adapted to be in a sealed state where an internal pressure is higher than an outside; a jet nozzle adapted to jet a high-pressure fluid to create cavitation bubble toward the surface to be executed inside the sealed vessel; and a pressure control section adapted to be able to adjust the internal pressure of the sealed vessel.

According to this configuration, the internal pressure of the sealed vessel can be made high, and thus an atmospheric pressure (a static pressure of the atmosphere) outside the cavitation bubble can be made large. Therefore, a pressure difference between the atmospheric pressure and a cavitation bubble internal pressure can be made large, and thus an impact pressure to be provided to the surface to be executed by the fluid jetted through the jet nozzle can be made large. Accordingly, the impact pressure due to collapse of the cavitation bubble can be favorably provided to the surface to be executed. Therefore, a tensile residual stress on the surface to be executed can be efficiently reformed to a compressive residual stress. Note that the pressure control section may be configured from a leak valve or may be a pressure control hole formed to penetrate the sealed vessel, and is not especially limited. Further, the sealed vessel has a thickness that does not generate a leak path between the surface to be executed and the sealed vessel.

In one aspect, the sealed vessel includes a vessel body, and a seal member provided between the vessel body and the surface to be executed.

According to this configuration, the seal member can be provided between the vessel body and the surface to be executed, and thus leakage of the fluid from the sealed vessel can be suppressed, and the internal pressure of the sealed vessel can be efficiently enhanced. The seal member may be configured from a resin material such as a foamed resin material or a silicone rubber.

In one aspect, the pressure control section is a pressure control hole formed to penetrate the sealed vessel.

According to this configuration, the pressure control hole is formed to penetrate the sealed vessel, so that the internal pressure of the sealed vessel can be maintained to be a predetermined pressure. To be specific, the pressure control hole is formed to penetrate the sealed vessel such that the internal pressure of the sealed vessel becomes 5 atmospheres or less.

In one aspect, the sealed vessel is provided to surround an outside of a jet region where an impact pressure is generated by the fluid jetted through the jet nozzle, on the surface to be executed.

According to this configuration, obstructing the fluid jetted through the jet nozzle toward the surface to be executed, by the sealed vessel, is suppressed. Therefore, the fluid jetted through the jet nozzle can be favorably jetted against the surface to be executed, and the impact pressure can be favorably provided to the surface to be executed.

In one aspect, a distance between the jet nozzle and the surface to be executed is longer than a distance between the jet nozzle and the surface to be executed in a release state where the sealed vessel is eliminated.

According to this configuration, the distance between the jet nozzle and the surface to be executed can be made long. That is, when the internal pressure of the sealed vessel becomes high, a jet width of the fluid jetted through the jet nozzle, the jet width being perpendicular to a jet direction of the fluid, becomes narrow. Therefore, the jet nozzle is separated from the surface to be executed, so that the jet width (jet region) of the fluid to be jetted against the surface to be executed can be made broad, and the fluid can be favorably jetted against the surface to be executed.

In one aspect, the water jet peening device further comprises a screen arranged in a periphery of the jet nozzle, wherein the jet nozzle diagonally jets the fluid against the surface to be executed, and the screen is arranged on the surface to be executed, the surface to be executed being positioned at a downstream side in a flow direction of the fluid jetted against and flowing on the surface to be executed.

According to this configuration, when the fluid jetted through the jet nozzle is diagonally jetted against the surface to be executed, the fluid jetted against and flowing on the surface to be executed spreads to a downstream side in a flow direction of the fluid. Therefore, the atmospheric pressure is decreased due to the spread of the fluid, and a stagnation point where the impact pressure is maximized (that is, a point where a flow velocity of the fluid jetted through the jet nozzle becomes 0) is moved to the downstream side in the flow direction of the fluid jetted against and flowing on the surface to be executed. In this case, the screen is provided at the downstream side in the flow direction of the fluid jetted against and flowing on the surface to be executed is provided, so that the fluid spreading to the downstream side in the flow direction can be suppressed. Accordingly, the decrease in the atmospheric pressure can be suppressed, and the stagnation point can be moved to an upstream side in the flow direction. Therefore, a decrease in the impact pressure to be provided to the fluid diagonally jetted toward the surface to be executed can be suppressed, and the fluid jetted through the jet nozzle can be favorably jetted against a predetermined position on the surface to be executed.

In one aspect, the jet nozzle includes a main jet nozzle adapted to jet the high-pressure fluid to create a cavitation bubble toward the surface to be executed, and an auxiliary jet nozzle provided in a periphery of the main jet nozzle, and adapted to jet the high-pressure fluid to create a cavitation bubble toward the surface to be executed.

According to this configuration, the fluid can be jetted toward the surface to be executed through the main jet nozzle and the auxiliary jet nozzle, and thus a dynamic pressure of the fluid jetted toward the surface to be executed can be enhanced. Accordingly, the atmospheric pressure (the dynamic pressure of the atmosphere) outside the cavitation bubble can be made large. Therefore, the pressure difference between the atmospheric pressure and the cavitation bubble internal pressure can be made large, and thus the impact pressure to be provided to the surface to be executed can be made large by the fluids jetted through the main jet nozzle and the auxiliary jet nozzle. Accordingly, the impact pressure due to collapse of the cavitation bubble can be favorably provided to the surface to be executed. Therefore, the tensile residual stress on the surface to be executed can be efficiently reformed to the compressive residual stress.

In one aspect, there is provided a water jet peening device comprising: a jet nozzle adapted to jet a high-pressure fluid to create a cavitation bubble toward a surface to be executed; and a screen arranged in a periphery of the jet nozzle, wherein the jet nozzle diagonally jets the fluid against the surface to be executed, and the screen is arranged on the surface to be executed, the surface to be executed being positioned at a downstream side in a flow direction of the fluid jetted against and flowing on the surface to be executed.

According to this configuration, when the fluid jetted through the jet nozzle is diagonally jetted against the surface to be executed, the fluid jetted against and flowing on the surface to be executed spreads to a downstream side in a flow direction of the fluid. Therefore, the atmospheric pressure is decreased due to the spread of the fluid, and a stagnation point where the impact pressure is maximized (that is, a point where a flow velocity of the fluid jetted through the jet nozzle becomes 0) is moved to the downstream side in the flow direction of the fluid jetted against and flowing on the surface to be executed. In this case, the screen is provided at the downstream side in the flow direction of the fluid jetted against and flowing on the surface to be executed is provided, so that the fluid spreading to the downstream side in the flow direction can be suppressed. Accordingly, a decrease in the atmospheric pressure is suppressed, and movement of the stagnation point to the downstream side in the flow direction can be suppressed. Therefore, a decrease in the impact pressure provided by the fluid diagonally jetted toward the surface to be executed can be suppressed, and the fluid jetted through the jet nozzle can be favorably jetted against the surface to be executed.

In one aspect, the screen is provided outside a jet region where an impact pressure is generated by the fluid jetted through the jet nozzle, on the surface to be executed.

According to this configuration, obstructing the fluid jetted through the jet nozzle toward the surface to be executed, by the screen, can be suppressed. Therefore, the fluid jetted through the jet nozzle can be favorably jetted against the surface to be executed, and the impact pressure can be favorably provided to the surface to be executed.

In one aspect, the screen is formed into an arc shape that surrounds the jet nozzle.

According to this configuration, the fluid jetted against and flowing on the surface to be executed to the downstream side in the flow direction can be favorably kept by the arc-shaped screen, and the spread of the fluid can be more favorably suppressed.

In one aspect, the screen is configured from a material having flexibility.

According to this configuration, the screen can be stuck to the surface to be executed, and can be caused to follow displacement due to jet of the fluid. Therefore, the fluid jetted against and flowing on the surface to be executed to the downstream side in the flow direction can be favorably kept by the screen, and the fluid spreading to the downstream side in the flow direction can be more favorably suppressed. Note that a material having flexibility is a resin material such as rubber.

In one aspect, the water jet peening device further comprises a rotation mechanism adapted to relatively rotate the screen centered at the jet nozzle.

According to this configuration, the screen can be relatively rotated to a predetermined position centered at the jet nozzle by the rotation mechanism.

In one aspect, the water jet peening device further comprises a slide mechanism adapted to relatively slide the screen with respect to the jet nozzle in a jet direction of the fluid jetted through the jet nozzle.

According to this configuration, the screen can be relatively slid to a predetermined position with respect to the jet nozzle in the jet direction by the slide mechanism.

In one aspect, the water jet peening device further comprises a sealed vessel accommodating the jet nozzle inside, provided to cover the surface to be executed, and adapted to be in a sealed state where an internal pressure is higher than an outside; and a pressure control section adapted to be able to adjust the internal pressure of the sealed vessel.

According to this configuration, the internal pressure of the sealed vessel can be made high, and thus the atmospheric pressure (the static pressure of the atmosphere) outside the cavitation bubble can be made large. Therefore, the pressure difference between the atmospheric pressure and the cavitation bubble internal pressure can be made large, and thus the impact pressure to be provided to the surface to be executed can be made large by the fluid jetted through the jet nozzle. Accordingly, the impact pressure due to collapse of the cavitation bubble can be favorably provided to the surface to be executed. Therefore, the tensile residual stress on the surface to be executed can be efficiently reformed to the compressive residual stress.

In one aspect, the jet nozzle includes a main jet nozzle adapted to jet the high-pressure fluid to create a cavitation bubble toward the surface to be executed, and an auxiliary jet nozzle provided in a periphery of the main jet nozzle, and adapted to jet the high-pressure fluid to create a cavitation bubble toward the surface to be executed.

According to this configuration, the fluid can be jetted toward the surface to be executed through the main jet nozzle and the auxiliary jet nozzle. Therefore, the impact pressure due to collapse of the cavitation bubble can be favorably provided to the surface to be executed, and the tensile residual stress on the surface to be executed can be efficiently reformed to the compressive residual stress.

In one aspect, there is provided a water jet peening device comprising: a main jet nozzle adapted to jet a high-pressure fluid to create a cavitation bubble toward a surface to be executed; and an auxiliary jet nozzle provided in a periphery of the main jet nozzle, and adapted to jet a high-pressure fluid to create a cavitation bubble toward the surface to be executed.

According to this configuration, the fluid can be jetted toward the surface to be executed through the main jet nozzle and the auxiliary jet nozzle, and thus the atmospheric pressure (the dynamic pressure of the atmosphere) outside the cavitation bubble contained in the high-pressure water can be made large. Therefore, the pressure difference between the atmospheric pressure and the cavitation bubble internal pressure can be made large, and thus the impact pressure to be provided to the surface to be executed can be made large by the fluids jetted through the main jet nozzle and the auxiliary jet nozzle. Accordingly, the impact pressure due to collapse of the cavitation bubble can be favorably provided to the surface to be executed. Therefore, the tensile residual stress on the surface to be executed can be efficiently reformed to the compressive residual stress.

In one aspect, a flow velocity of the fluid jetted through the main jet nozzle is faster than a flow velocity of the fluid jetted through the auxiliary jet nozzle.

According to this configuration, a dynamic pressure of the fluid jetted through the main jet nozzle can be made larger than a dynamic pressure of the fluid jetted through the auxiliary jet nozzle.

In one aspect, the auxiliary jet nozzle is provided to surround a periphery of the main jet nozzle.

According to this configuration, the auxiliary jet nozzle can be provided to surround the periphery of the main jet nozzle, and thus the fluid jetted through the main jet nozzle becoming deviated flow by the fluid jetted through the auxiliary jet nozzle can be suppressed. When a plurality of the auxiliary jet nozzles is provided to surround the periphery of the main jet nozzle at predetermined intervals, three or more auxiliary jet nozzles are favorable.

In one aspect, a jet direction of the fluid jetted through the auxiliary jet nozzle is same as a jet direction of the fluid jetted through the main jet nozzle, or is a direction inclined toward a side of the main jet nozzle.

According to this configuration, the fluid jetted through the auxiliary jet nozzle does not obstruct the fluid jetted through the main jet nozzle. When the jet direction of the fluid jetted through the auxiliary jet nozzle is caused to be the direction inclined to the side of the main jet nozzle, it is favorable to determine an angle such that the fluid jetted through the auxiliary jet nozzle does not obstruct the fluid jetted through the main jet nozzle.

In one aspect, the water jet peening device further comprises a main supply line connected to the main jet nozzle, and adapted to supply the fluid to the main jet nozzle; and an auxiliary supply line connected to the auxiliary jet nozzle, and adapted to supply the fluid to the auxiliary jet nozzle, wherein the main supply line and the auxiliary supply line are independent individual supply lines.

According to this configuration, the main supply line and the auxiliary supply line are the independent supply lines, so that the dynamic pressure of the fluid jetted through the main jet nozzle and the dynamic pressure of the fluid jetted through the auxiliary jet nozzle can be caused to be high dynamic pressures. Therefore, the dynamic pressures of the fluids jetted through the main jet nozzle and the auxiliary jet nozzle toward the surface to be executed can be further enhanced.

In one aspect, the water jet peening device further comprises a main supply line connected to the main jet nozzle, and adapted to supply the fluid to the main jet nozzle; and an auxiliary supply line connected to the auxiliary jet nozzle, and adapted to supply the fluid to the auxiliary jet nozzle, wherein the main supply line and the auxiliary supply line are a same integrated supply line.

According to this configuration, the main supply line and the auxiliary supply line can be the integrated supply line, and thus the structure around the supply line can be simplified and can be made compact.

In one aspect, cross sections of the main jet nozzle and the auxiliary jet nozzle, the cross sections being obtained by cutting the main jet nozzle and the auxiliary jet nozzle in a plane perpendicular to the jet direction of the fluid, have circular shapes, respectively.

According to this configuration, the main jet nozzle and the auxiliary jet nozzle can have the same cross sectional shape. At this time, an opening area of the main jet nozzle may be made larger than an opening area of the auxiliary jet nozzle, or the opening area of the main jet nozzle may be made the same as the opening area of the auxiliary jet nozzle. Further, the opening area of the main jet nozzle may be made smaller than the opening area of the auxiliary jet nozzle.

In one aspect, the cross section of at least one of the main jet nozzle and the auxiliary jet nozzle, the cross section being obtained by cutting the main jet nozzle or the auxiliary jet nozzle in a plane perpendicular to the jet direction of the fluid, is the circular shape, and a nozzle tip side has a tapered shape with a diameter becoming larger toward the jet direction of the fluid.

According to this configuration, the nozzle tip side has the tapered shape, so that the atmosphere around the nozzle tip of each jet nozzle can be taken in, and the fluid can be jetted through each jet nozzle. Therefore, the dynamic pressure of the fluid jetted through each jet nozzle can be made large. Note that a tapered angle of the nozzle tip having the tapered shape is favorably about 60°.

In one aspect, the cross section of the main jet nozzle, the cross section being obtained by cutting the main jet nozzle in a plane perpendicular to the jet direction of the fluid, is the circular shape, and the cross section of the auxiliary jet nozzle, the cross section being obtained by cutting the auxiliary jet nozzle in a plane perpendicular to the jet direction of the fluid, has an annular shape along an outer periphery of the main jet nozzle, and an inner-side peripheral surface of a tip side of the auxiliary jet nozzle has a straight shape with a same diameter toward the jet direction of the fluid, and an outer-side peripheral surface has a tapered shape with a diameter becoming larger toward the jet direction of the fluid.

According to this configuration, the outer-side peripheral surface has the tapered shape at the nozzle tip side of the auxiliary jet nozzle, so that the atmosphere around the nozzle tip of the auxiliary jet nozzle in an outer peripheral side can be taken in, and the fluid can be jetted through the auxiliary jet nozzle. Therefore, the dynamic pressure of the fluid jetted through the auxiliary jet nozzle can be made large. Meanwhile, the inner-side peripheral surface has the straight shape at the nozzle tip side of the auxiliary jet nozzle, so that taking in of the atmosphere can be suppressed in an inner peripheral side of the auxiliary jet nozzle, and thus interference with the fluid jetted through the main jet nozzle can be suppressed.

In one aspect, the main jet nozzle and the auxiliary jet nozzle are separately formed.

According to this configuration, the main jet nozzle and the auxiliary jet nozzle are separately formed, so that the main jet nozzle and the auxiliary jet nozzle can be separately treated.

In one aspect, the main jet nozzle and the auxiliary jet nozzle are integrally formed.

According to this configuration, the main jet nozzle and the auxiliary jet nozzle can be the integrated jet nozzle, and thus the configuration of the jet nozzle can be simplified and can be made compact.

In one aspect, the water jet peening device further comprises a sealed vessel accommodating the main jet nozzle and the auxiliary jet nozzle inside, provided to cover the surface to be executed, and adapted to be in a sealed state where an internal pressure is higher than an outside; and a pressure control section adapted to be able to adjust the internal pressure of the sealed vessel.

According to this configuration, the internal pressure of the sealed vessel can be made high, and thus the atmospheric pressure (the static pressure of the atmosphere) outside the cavitation bubble can be made large. Therefore, the pressure difference between the atmospheric pressure and the cavitation bubble internal pressure can be made large, and thus the impact pressure to be provided to the surface to be executed can be made large by the fluids jetted through the main jet nozzle and the auxiliary jet nozzle. Accordingly, the impact pressure due to collapse of the cavitation bubble can be favorably provided to the surface to be executed. Therefore, the tensile residual stress on the surface to be executed can be efficiently reformed to the compressive residual stress.

Further, it is favorable to further include a screen arranged in a periphery of the main jet nozzle and the auxiliary jet nozzle, and it is favorable that the main jet nozzle diagonally jets the fluid against the surface to be executed, and the screen is arranged on the surface to be executed, the surface to be executed being positioned at a downstream side in a flow direction of the fluid jetted against and flowing on the surface to be executed.

In one aspect, the water jet peening device further comprises a screen arranged in a periphery of the main jet nozzle and the auxiliary jet nozzle, wherein the main jet nozzle diagonally jets the fluid against the surface to be executed, and the screen is arranged on the surface to be executed, the surface to be executed being positioned at a downstream side in a flow direction of the fluid jetted against and flowing on the surface to be executed.

DESCRIPTION OF EMBODIMENTS

Hereinafter, embodiments according to the present invention will be described in detail based on the drawings. Note that the present invention is not limited by the embodiments. Further, configuration elements in the embodiments below include those replaceable by a person skilled in the art, those easy for the person skilled in the art, and those substantially the same. Further, the configuration elements described below can be appropriately combined, and when there is a plurality of embodiments, the embodiments can be combined.

First Embodiment

Figure 1:
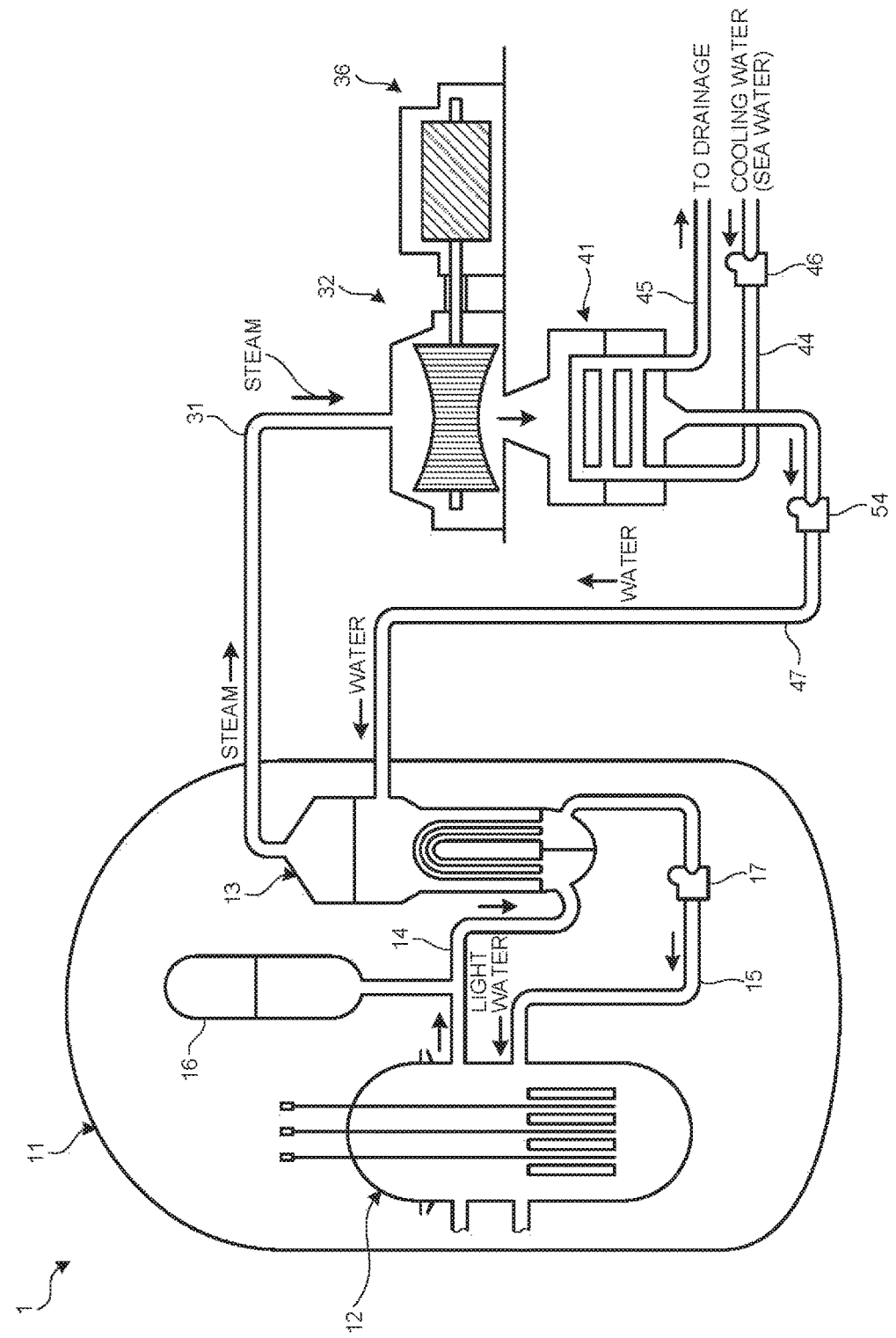
FIG. 1 is a schematic configuration diagram of an atomic power plant.
Figure 2:
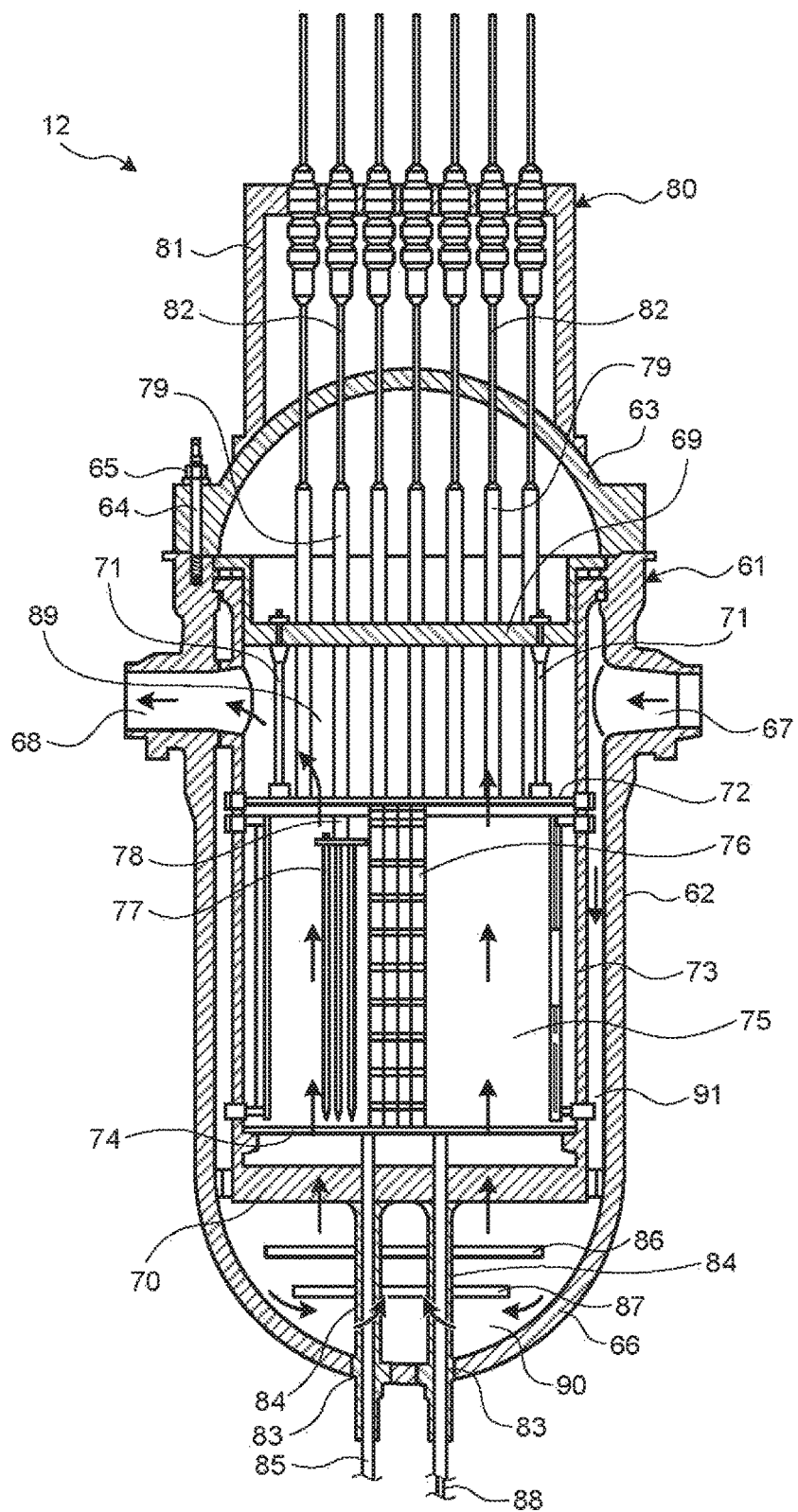
FIG. 2 is a vertical sectional view illustrating a pressurized water nuclear reactor.
Figure 3:
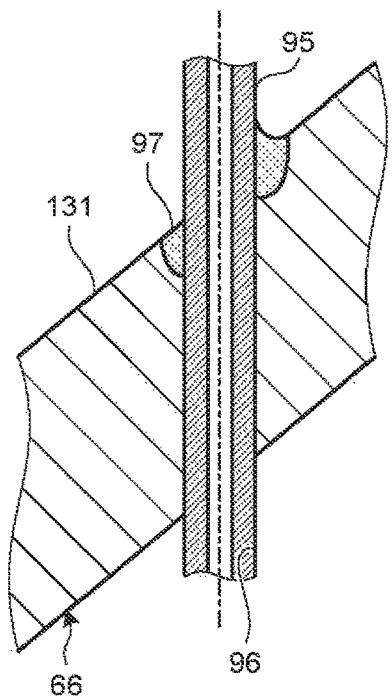
FIG. 3 is a sectional view illustrating an instrumentation nozzle of a nuclear reactor vessel.
Figure 4:
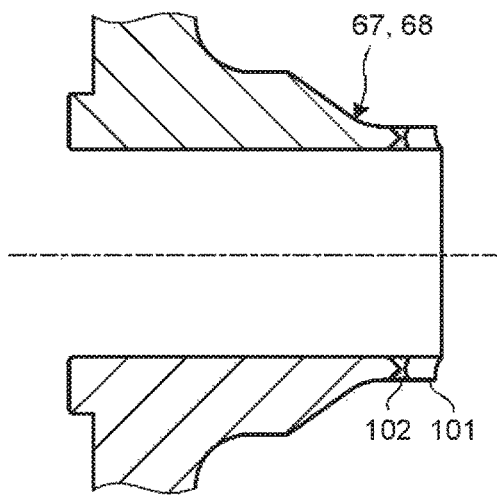
FIG. 4 is a sectional view illustrating an inlet nozzle and an outlet nozzle of a nuclear reactor vessel.

FIG. 1 is a schematic configuration diagram of an atomic power plant. FIG. 2 is a vertical sectional view illustrating a pressurized water nuclear reactor. FIG. 3 is a sectional view illustrating an instrumentation nozzle of a nuclear reactor vessel. FIG. 4 is a sectional view illustrating an inlet nozzle and an outlet nozzle of a nuclear reactor vessel.

A nuclear reactor of the first embodiment is a pressurized water nuclear reactor 12 that uses light water as a nuclear reactor coolant and a neutron moderator, causes the light water to be high-temperature and high-pressure water not boiled in the entire reactor internal, sends the high-temperature and high-pressure water to a steam generator to generate steam by heat exchange, and sends the steam to a turbine power generator to generate power.

In an atomic power plant 1 including the pressurized water nuclear reactor 12 of the first embodiment, a containment 11 stores the pressurized water nuclear reactor 12 and a steam generator 13 therein, as illustrated in FIG. 1. The pressurized water nuclear reactor 12 and the steam generator 13 are coupled through a high temperature-side feed pipe 14 and a low temperature-side feed pipe 15. The high temperature-side feed pipe 14 is provided with a pressurizer 16, and the low temperature-side feed pipe 15 is provided with a primary cooling water pump 17. In this case, to suppress the boil of primary cooling water in a reactor internal section using the light water as the moderator and the primary cooling water, a primary cooling system controls the primary cooling water to maintain a high-pressure state of about 150 to 160 atmospheres by the pressurizer 16.

Therefore, in the pressurized water nuclear reactor 12, the light water is heated as the primary cooling water by slightly enriched uranium or MOX as a fuel (atomic fuel), and the high-temperature primary cooling water is sent to the steam generator 13 through the high temperature-side feed pipe 14 in a state of being maintained to have a predetermined high pressure by the pressurizer 16. In the steam generator 13, heat exchange is performed between the high-temperature and high-pressure primary cooling water and secondary cooling water, and the cooled primary cooling water is returned to the pressurized water nuclear reactor 12 through the low temperature-side feed pipe 15.

The steam generator 13 is coupled with a steam turbine 32 through a pipe 31 that feeds the heated secondary cooling water, that is, steam, and a power generator 36 is connected to the steam turbine 32.

Further, the steam turbine 32 is connected with a steam condenser 41 into which the steam flowing out from the steam turbine 32 flows. The steam condenser 41 is coupled with a water intake pipe 44 and a drain pipe 45 that feed/discharge the cooling water (for example, sea water). The water intake pipe 44 includes a circulating water pump 46, and the other end portion of the circulating water pump 46 is arranged under the sea together with the drain pipe 45.

Then, the steam condenser 41 is connected with a pipe 47. The pipe 47 is provided with a water feed pump 54. The water feed pump 54 supplies the secondary cooling water from the steam condenser 41 toward the steam generator 13.

Therefore, the steam generated through the heat exchange with the high-temperature and high-pressure primary cooling water in the steam generator 13 is sent to the steam turbine 32 through the pipe 31 and drives the steam turbine 32, and the power generator 36 generates power. The steam that has driven the steam turbine 32 is then cooled in the steam condenser 41 using sear water to become condensed water, and is returned to the steam generator 13 by the water feed pump 54 through the pipe 47.

In the pressurized water nuclear reactor 12 of the atomic power plant 1 configured as described above, a nuclear reactor vessel 61 is configured from, as illustrated in FIG. 2, a nuclear reactor vessel body 62 and a nuclear reactor vessel cover (upper mirror) 63 mounted on the nuclear reactor vessel body 62 so that an in-core structure can be inserted therein. The nuclear reactor vessel cover 63 is fixed to the nuclear reactor vessel body 62 with a plurality of statvolts 64 and nuts 65 in an openable/closable manner.

The nuclear reactor vessel body 62 has a cylindrical shape where an upper portion can be opened by removing the nuclear reactor vessel cover 63, and a lower portion is blocked with a hemispherical lower mirror 66. Further, the nuclear reactor vessel body 62 includes an inlet nozzle 67 that supplies the light water as the primary cooling water and an outlet nozzle 68 that discharges the light water, which are formed in upper portions.

In the nuclear reactor vessel body 62, an upper core support 69 is fixed above the inlet nozzle 67 and the outlet nozzle 68, and a lower core support 70 is fixed near the lower mirror 66. The upper core support 69 and the lower core support 70 have a disk shape, and in which a large number of flow holes (not illustrated) is formed. The upper core support 69 is coupled with an upper core plate 72 below in which a large number of flow holes (not illustrated) is formed, through a plurality of reactor internal support rods 71.

A core barrel 73 having a cylindrical shape is arranged in the nuclear reactor vessel body 62 with a predetermined space from an inner wall surface. An upper portion of the core barrel 73 is coupled with the upper core plate 72, and a lower portion of the core barrel 73 is coupled with a lower core support plate 74 having a disk shape, in which a large number of flow holes (not illustrated) is formed. Then, the lower core support plate 74 is supported by the lower core support 70. That is, the core barrel 73 is hung from and supported by the lower core support 70 of the nuclear reactor vessel body 62.

A reactor internal 75 is formed of the upper core plate 72, the core barrel 73, and the lower core support plate 74, and has a large number of fuel assemblies 76 arranged therein. Although not illustrated, the fuel assemblies 76 are configured such that a large number of fuel rods is bundled with a support lattice in a lattice manner, and an upper nozzle is fixed to an upper end portion and a lower nozzle is fixed to a lower end portion. Further, the reactor internal 75 has a large number of control rods 77 arranged therein. Upper end portions of the large number of control rods 77 are put together to become a control rod cluster 78, and can be inserted into the fuel assemblies 76. A large number of control rod cluster guide pipes 79 penetrates and is fixed to the upper core support 69, and lower end portions of the respective control rod cluster guide pipes 79 extend to the control rod cluster 78 in the fuel assemblies 76.

The nuclear reactor vessel cover 63 that configures the nuclear reactor vessel 61 has a semispherical upper portion and is provided with a magnetic jack control rod driving mechanism 80, and is accommodated in a housing 81 integrally formed with the nuclear reactor vessel cover 63. Upper end portions of the large number of control rod cluster guide pipes 79 extend to the control rod driving mechanism 80. Control rod cluster drive shafts 82 extend from the control rod driving mechanism 80, pass inside the control rod cluster guide pipes 79 and extend to the fuel assemblies 76, and can hold the control rod cluster 78.

The control rod driving mechanism 80 runs in an up and down direction and is coupled with the control rod cluster 78, and moves up and down, with a magnetic jack, the control rod cluster drive shafts 82 having a plurality of peripheral grooves arranged in its surface in a longitudinal direction at regular pitches, thereby to control an output of the pressurized water nuclear reactor 12.

Further, the nuclear reactor vessel body 62 is provided with a large number of instrumentation nozzles 83 penetrating the lower mirror 66. Upper end portions at an in-core side of the instrumentation nozzles 83 are coupled with in-core instrumentation guide pipes 84, and lower end portions at an ex-core side are coupled with conduit tubes 85. Upper end portions of the in-core instrumentation guide pipes 84 are coupled with the lower core support 70, and upper and lower connection plates 86 and 87 for suppressing vibration are attached to the in-core instrumentation guide pipes 84. A neutron flux detector (not illustrated) that can measure neutron fluxes is mounted to a thimble tube 88, and the thimble tube 88 passes through the instrumentation nozzle 83 and the in-core instrumentation guide pipe 84 from the conduit tube 85, penetrates the lower core support plate 74, and can be inserted into the fuel assemblies 76.

Therefore, the control rod driving mechanism 80 moves the control rod cluster drive shafts 82 to pull out the control rods 77 from the fuel assemblies 76 by a predetermined amount, thereby to control nuclear fission in the reactor internal 75. The light water filled in the nuclear reactor vessel 61 is heated by the generated thermal energy, and the high-temperature light water is discharged through the outlet nozzle 68 and is sent to the steam generator 13, as described above. That is, the atomic fuel that configures the fuel assemblies 76 performs the nuclear fission to emit neutrons. The light water as the moderator and the primary cooling water decreases kinetic energy of the emitted high-speed neutrons to have thermal neutrons and facilitates new nuclear fission, and performs cooling by taking the generated heat. Meanwhile, the control rod driving mechanism 80 inserts the control rods 77 into the fuel assemblies 76 to adjust the number of neutrons generated in the reactor internal 75, and inserts all of the control rods 77 into the fuel assemblies 76 to urgently stop the nuclear reactor.

Further, the nuclear reactor vessel 61 has an upper plenum 89 formed above the reactor internal 75, the upper plenum 89 communicating into the outlet nozzle 68, and a lower plenum 90 formed below the reactor internal 75. Then, a downcomer section 91 communicating into the inlet nozzle 67 and the lower plenum 90 is formed between the nuclear reactor vessel 61 and the core barrel 73. Therefore, the light water flows through the inlet nozzle 67 into the nuclear reactor vessel body 62, flows downward in the downcomer section 91, reaches the lower plenum 90, is guided upward on a spherical inner surface of the lower plenum 90, passes through the lower core support 70 and the lower core support plate 74, and then flows into the reactor internal 75. The light water flowing into the reactor internal 75 absorbs the thermal energy generated from the fuel assemblies 76 that configure the reactor internal 75 to cool the fuel assemblies 76. Further, the light water reaches a high temperature and passes through the upper core plate 72, rises up to the upper plenum 89, and passes through the outlet nozzle 68 and is discharged.

In the nuclear reactor vessel 61 configured as described above, the instrumentation nozzle 83 is configured such that an in-core instrumentation tube 95 is inserted into an attaching hole 96 formed in the lower mirror 66 of the nuclear reactor vessel body 62, and an upper end portion of the in-core instrumentation tube 95 is fixed to an inner surface 131 of the lower mirror 66 by means of welding (with a welded portion 97), as illustrated in FIG. 3. The nuclear reactor vessel body 62 is configured such that stainless steel is buttered and welded to an inner surface of low alloy steel as a base material, and the in-core instrumentation tube 95 made of a nickel based alloy is welded (with the welded portion 97) to the nuclear reactor vessel body 62 with a material made of a nickel based alloy in a state of being inserted in the attaching hole 96 of the nuclear reactor vessel body 62.

Further, as illustrated in FIG. 4, in the nuclear reactor vessel 61, a safe end pipe 101 is welded to end surfaces of the inlet nozzle 67 and the outlet nozzle 68 (hereinafter, referred to as nozzles 67 and 68), and thus welded portions 102 are formed between the respective nozzles 67 and 68 and the safe end pipes 101.

Therefore, there is a possibility that a tensile stress remains in the in-core instrumentation tube 95, the welded portion 97, and peripheral portions thereof, and similarly, there is a possibility that a tensile stress remains in the welded portions 102 and its peripheral portions. Therefore, a possibility of generation of stress corrosion cracking becomes high due to long-term use. Therefore, a water jet peening (WJP) device 110 as a nuclear reactor repair device reforms the tensile residual stress on a surface to a compressive residual stress, thereby to prevent the stress corrosion cracking. The water jet peening device 110 jets high-pressure water (a fluid) to create cavitation bubbles caused by cavitation toward surfaces of the welded portions 97 and 102 under water to reform the tensile residual stress on the surfaces of the welded portions 97 and 102 to the compressive residual stress.

By the way, an impact pressure to be provided to the surfaces of the welded portions 97 and 102 by the water jet peening device 110 becomes larger as a pressure difference between a pressure of an atmosphere around the jetted high-pressure water (hereinafter, referred to as atmospheric pressure) and a pressure inside the cavitation bubbles generated inside the high-pressure water (hereinafter, referred to as cavitation bubble internal pressure) is larger. To be specific, the larger the atmospheric pressure and the smaller the cavitation bubble internal pressure, the larger the impact pressure. The water jet peening device 110 of the first embodiment makes the impact pressure to be provided to the surfaces of the welded portions 97 and 102 large by making an atmospheric pressure (a static pressure of the atmosphere) outside the cavitation bubbles large.

Figure 5:
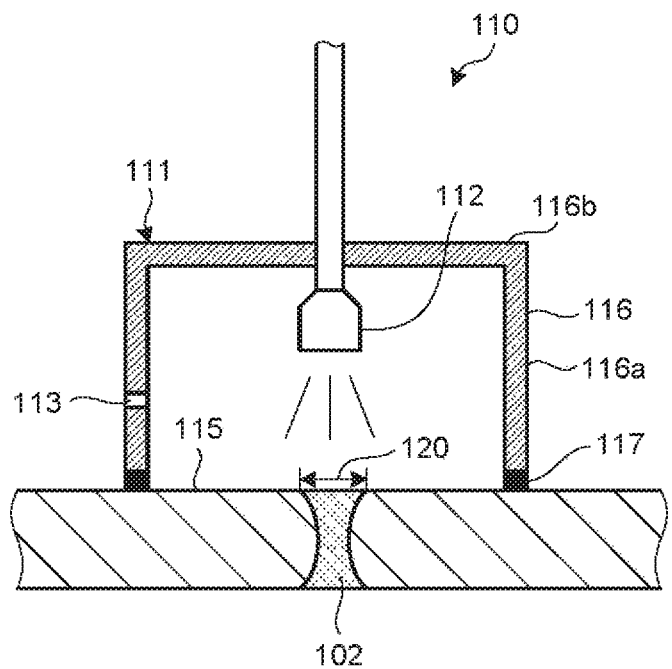
FIG. 5 is a schematic view illustrating a water jet peening device according to a first embodiment.

FIG. 5 is a schematic view illustrating the water jet peening device according to the first embodiment. The water jet peening device 110 of the first embodiment is mainly used to reform the surfaces of the welded portions 102 between the inlet nozzle 67 and the outlet nozzle 68, and the safe end pipes 101. Here, the welded portions 102 are formed throughout the entire peripheries of the respective nozzles 67 and 68, and the water jet peening device 110 jets the high-pressure water along the welded portions 102.

As illustrated in FIG. 5, the water jet peening device 110 includes a sealed vessel 111, a jet nozzle 112, and a pressure control hole 113, and the jet nozzle 112 is moved along the welded portion 102 by a moving mechanism (not illustrated).

The sealed vessel 111 is provided in contact with nozzle peripheral surfaces 115 including inner peripheral surfaces and outer peripheral surfaces of the respective nozzles 67 and 68 to cover the surfaces of the welded portions 102 that serve as surfaces to be executed. The sealed vessel 111 causes its inside to be in a sealed state so that its internal pressure becomes higher than an external pressure. The sealed vessel 111 includes a vessel body 116 and a seal member 117.

The vessel body 116 is integrally formed of a cylindrical body section 116a and a circular top plate section 116b provided at one side (an upper side in FIG. 5) of the body section 116a. The other side (a lower side of FIG. 5) of the body section 116a is a circular opening. The jet nozzle 112 to be described below is provided to penetrate the center of the top plate section 116b of the vessel body 116, and the vessel body 116 is fixed to the jet nozzle 112 so that the vessel body 116 and the jet nozzle 112 are integrated with each other.

The seal member 117 is annularly formed and attached to an annular end portion of the vessel body 116 at the opening side (the other side). The seal member 117 is arranged between the vessel body 116 and the nozzle peripheral surface 115, and is configured from a foamed resin material or a resin material such as silicone rubber, for example. Here, the vessel body 116 to which the seal member 117 is attached is attached to the jet nozzle 112 moved along the welded portion 102, and thus the seal member 117 is slid against the nozzle peripheral surface 115. Therefore, the seal member 117 is made of a slidable material against the nozzle peripheral surface 115 while maintaining the sealed state inside the sealed vessel 111.

The jet nozzle 112 jets the high-pressure water to create the cavitation bubbles toward the welded portion 102. The above-described sealed vessel 111 is integrally attached to the jet nozzle 112, and the jet nozzle 112 and the sealed vessel 111 can be moved together. The high-pressure water jetted through the jet nozzle 112 is jetted against the welded portion 102 and the cavitation bubbles collapse, so that the impact pressure is provided to the surface of the welded portion 102. At this time, a predetermined region where the impact pressure is generated by the high-pressure water jetted through the jet nozzle 112 is a jet region 120.

The jet region 120 is a circular region where the center of when a jet direction of the jetted high-pressure water and the surface of the welded portion 102 against which the high-pressure water is jetted are perpendicular to each other, is a stagnation point. The stagnation point is a point where a flow velocity (jet flow velocity) of the jetted high-pressure water is zero, and is also a point where the impact pressure is maximized. Therefore, in the circular jet region 120, the impact pressure is largest in the center and becomes smaller toward an outside in a radial direction.

Here, the sealed vessel 111 is provided to surround the outside of the jet region 120 to suppress an influence on the high-pressure water jetted through the jet nozzle 112. Further, the sealed vessel 111 has a thickness that does not cause a leak path between the nozzle peripheral surface 115 and the sealed vessel 111. That is, the vessel body 116 and the seal member 117 of the sealed vessel 111 have a thickness in the radial direction that does not cause the leak path.

The pressure control hole 113 is formed to penetrate the vessel body 116 of the sealed vessel 111. The pressure control hole 113 has a shape that can maintain the internal pressure of the sealed vessel 111 to a predetermined pressure. To be specific, the pressure control hole 113 has a shape that can maintain the internal pressure of the sealed vessel 111 to 5 atmospheres or less.

Here, when the internal pressure of the sealed vessel 111 is increased, a jet width of the high-pressure water jetted through the jet nozzle 112, the jet width being perpendicular to the jet direction of the high-pressure water, becomes narrow. In this case, the jet region 120 on the surface of the welded portion 102 becomes small. Therefore, the distance between the jet nozzle 112 and the surface of the welded portion 102 becomes longer than the distance between the jet nozzle 112 and the surface of the welded portion 102 in a release state where the sealed vessel 111 is eliminated.

In the water jet peening device 110 configured as described above, when the high-pressure water is jetted through the jet nozzle 112 toward the surface of the welded portion 102, the high-pressure water is jetted against the surface of the welded portion 102. Then, the cavitation bubbles created in the high-pressure water collapse, so that the impact pressure is caused on the surface of the welded portion 102.

Here, the high-pressure water jetted through the jet nozzle 112 is jetted toward the inside of the sealed vessel 111, and thus the internal pressure of the sealed vessel 111 is increased. Accordingly, the internal pressure of the sealed vessel 111 becomes higher than the external pressure. At this time, since the pressure control hole 113 is formed in the sealed vessel 111, the sealed vessel 111 maintains the internal pressure to the predetermined pressure while maintaining a state where the internal pressure is higher than the external pressure.

As described above, according to the first embodiment, the water jet peening device 110 can make the internal pressure of the sealed vessel 111 high, and thus can make the atmospheric pressure (the static pressure of the atmosphere) outside the cavitation bubbles large. Therefore, the water jet peening device 110 can make the pressure difference between the atmospheric pressure and the cavitation bubble internal pressure large, and thus can make the impact pressure to be provided to the surface of the welded portion 102 large by the high-pressure water jetted through the jet nozzle 112. Accordingly, the water jet peening device 110 can favorably provide the impact pressure due to the collapse of the cavitation bubbles to the surface of the welded portion 102. Therefore, the water jet peening device 110 can efficiently reform the tensile residual stress on the surface of the welded portion 102 to the compressive residual stress.

Further, according to the first embodiment, the seal member 117 can be provided between the vessel body 116 and the nozzle peripheral surface 115. Therefore, the water jet peening device 110 can suppress water leakage from the sealed vessel 111, and can efficiently enhance the internal pressure of the sealed vessel 111.

Further, according to the first embodiment, the sealed vessel 111 is formed to penetrate the pressure control hole 113. Therefore, the water jet peening device 110 can maintain the internal pressure of the sealed vessel 111 to the predetermined pressure.

Further, according to the first embodiment, the sealed vessel 111 is provided to surround the outside of the jet region 120. Therefore, obstructing the high-pressure water jetted through the jet nozzle 112 toward the surface of the welded portion 102, by the sealed vessel 111, can be suppressed. Therefore, the water jet peening device 110 can favorably jet the high-pressure water jetted through the jet nozzle 112 toward the surface of the welded portion 102, and can favorably provide the impact pressure to the surface of the welded portion 102.

Further, according to the first embodiment, the distance between the jet nozzle 112 and the surface of the welded portion 102 can be taken long. Therefore, by separating the jet nozzle 112 from the surface of the welded portion 102, the water jet peening device 110 can make the jet region 120 on the surface of the welded portion 102 broad, and can favorably jet the high-pressure water against the surface of the welded portion 102.

In the first embodiment, the pressure control hole 113 is formed to penetrate the vessel body 116. However, an embodiment is not limited to this configuration, and any configuration can be employed as long as the pressure control section that can maintain the internal pressure of the sealed vessel 111 to the predetermined pressure. To be specific, a leak valve may be provided, in place of the pressure control hole 113, as the pressure control section that can maintain the internal pressure of the sealed vessel 111 to the predetermined pressure. That is, a through hole may be formed in the vessel body 116 of the sealed vessel 111, and a connection pipe communicating into the through hole may be attached to an outside of the vessel body 116, and the leak valve may be inserted to the connection pipe. According to this configuration, the water jet peening device 110 can maintain the internal pressure of the sealed vessel 111 to the predetermined pressure with the leak valve.

Second Embodiment

Figure 6:
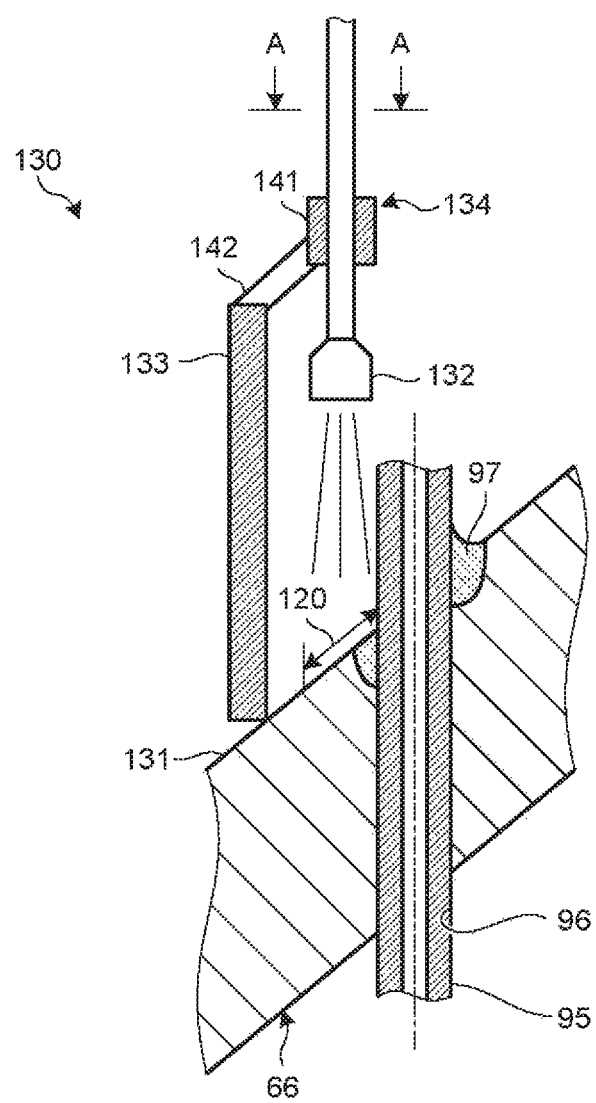
FIG. 6 is a schematic view illustrating a water jet peening device according to a second embodiment.
Figure 7:
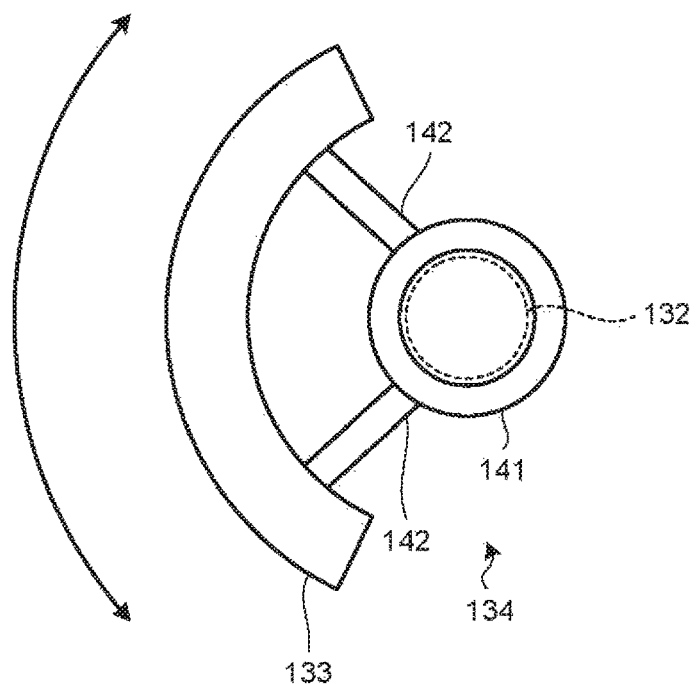
FIG. 7 is an A-A arrow view of FIG. 6.

Next, a water jet peening device 130 according to a second embodiment will be described with reference to FIGS. 6 and 7. FIG. 6 is a schematic view illustrating the water jet peening device according to the second embodiment. FIG. 7 is an A-A arrow view of FIG. 6. In the second embodiment, to avoid overlapping description, portions different from those in the first embodiment will be described, and portions similar to those in the first embodiment are denoted with the same reference signs.

As illustrated in FIG. 6, the water jet peening device 130 of the second embodiment is mainly used to reform a surface of a welded portion 97 around an in-core instrumentation tube 95. Here, the welded portion 97 is formed throughout an outer periphery of the in-core instrumentation tube 95, and the water jet peening device 130 jets high-pressure water toward a curved inner surface 131 of a lower mirror 66 along the welded portion 97.

As illustrated in FIGS. 6 and 7, the water jet peening device 130 includes a jet nozzle 132, a screen 133, and a rotation slide mechanism 134, and the jet nozzle 132 is moved along the welded portion 97 by a moving mechanism (not illustrated). Note that the jet nozzle 132 is similar to the jet nozzle 112 of the first embodiment, and thus description is omitted.

The high-pressure water jetted through the jet nozzle 132 is jetted against the welded portion 97, and cavitation bubbles collapse, so that an impact pressure is provided to a surface of the welded portion 97. Here, a jet direction of the jetted high-pressure water and the surface of the welded portion 97 against which the high-pressure water is jetted diagonally intersect. That is, the inner surface 131 at one side (the left side in FIG. 6) is lower than the inner surface 131 at the other side (the right side in FIG. 6) across the high-pressure water jetted through the jet nozzle 132. Therefore, the high-pressure water jetted against and flowing on the surface of the welded portion 97 spreads along the inner surface 131 at the lower side (downward side). At this time, a stagnation point where the impact pressure is maximized is moved to the inner surface 131 of the downward side across the high-pressure water on the jet region 120 where the impact pressure is generated by the high-pressure water, and the high-pressure water flows along the inner surface 131 of the downward side. Therefore, there is a possibility of a decrease in an atmospheric pressure.

Changing the jet direction of the jet nozzle 132 along the inner surface 131 of the lower mirror 66 so that the jet direction of the jet nozzle 132 and the inner surface 131 of the lower mirror 66 become perpendicular to each other can be considered. However, in this case, a mechanism to change the jet direction of the jet nozzle 132 needs to be provided, and there is also a spatial constraint on arrangement of the jet nozzle 132, and it is thus difficult.

Therefore, in the second embodiment, the screen 133 is arranged around the jet nozzle 132. The screen 133 is attached to the jet nozzle 132 through the rotation slide mechanism 134. The screen 133 is arranged on the inner surface 131 positioned at a downstream side in a flow direction of the high-pressure water jetted against and flowing on the inner surface 131, and keeps the flow of the high-pressure water.

The screen 133 is formed into an arc shape that surround the jet nozzle 132. Therefore, a space is partitioned by the screen 133 and the inner surface 131 of the lower mirror 66, and the high-pressure water can be kept in this space. Further, the screen 133 is configured from a material that does not pollute water and has strength, and is configured from stainless steel, for example.

In the second embodiment, the screen 133 has been configured from stainless steel. However, the screen 133 may be configured from a material having flexibility, and may be configured from a resin material such as rubber. In this case, the screen 133 can be stuck to the inner surface 131 of the lower mirror 66. Further, even if the distance between the screen 133 and the inner surface 131 of the lower mirror 66 is displaced due to vibration generated by jetting of the high-pressure water, the screen 133 can be deformed following the displacement. Accordingly, the screen 133 suppresses water leakage between the screen 133 and the inner surface 131.

Here, the screen 133 is attached to the jet nozzle 132 moved along the welded portion 97 through the rotation slide mechanism 134, and thus the screen 133 is slid against the inner surface 131. Therefore, the screen 133 is made of a material slidable against the inner surface 131.

Further, the screen 133 is arranged outside the jet region 120 formed on the surface around the welded portion 97 in a state where the screen 133 is eliminated in order to suppress an influence on the high-pressure water jetted through the jet nozzle 132.

The rotation slide mechanism 134 has a mechanism to move the screen 133 with respect to the jet nozzle 132. The rotation slide mechanism 134 rotates the screen 133 around the jet nozzle 132, and slides the screen 133 in the jet direction of the high-pressure water jetted through the jet nozzle 132. The rotation slide mechanism 134 is configured from a cylinder member 141 provided to an outer periphery of the jet nozzle 132, and a plurality of stay members 142 that connects the cylinder member 141 and the screen 133.

The cylinder member 141 has a cylindrical shape, and an inner peripheral surface thereof is provided throughout the entire periphery along the outer periphery of the jet nozzle 132 to face an outer peripheral surface of the jet nozzle 132. The cylinder member 141 is slidable against the jet nozzle 132 in the jet direction, and is also rotatable in a peripheral direction of the jet nozzle 132.

The plurality of stay members 142 couples an outer peripheral surface of the cylinder member 141 and an inner surface of the arc-shaped screen 133 (a surface at the jet nozzle 132 side). The plurality of stay members 142 is arranged along an outer periphery of the cylinder member 141 at predetermined intervals. Accordingly, the screen 133 is moved with movement of the cylinder member 141.

In the water jet peening device 130 configured as described above, when the high-pressure water is jetted through the jet nozzle 132 toward the surface of the welded portion 97, the high-pressure water is jetted against the surface of the welded portion 97. Then, cavitation bubbles created in the high-pressure water collapse, so that the impact pressure is caused on the surface of the welded portion 97.

Here, the high-pressure water jetted through the jet nozzle 132 flows to a downstream side along the inner surface 131 of the lower mirror 66. At this time, the flow of the high-pressure water is kept by the screen 133. Therefore, the high-pressure water less easily flows to the downstream side of the inner surface 131, and thus movement of the stagnation point in the jet region 120 to the downstream side of the inner surface 131 can be suppressed, and a decrease in the atmospheric pressure can be suppressed.

As described above, according to the second embodiment, the high-pressure water spreading to the downstream side of the inner surface 131 can be kept by the screen 133. Therefore, the movement of the stagnation point in the jet region 120 to the downward side can be suppressed, and a decrease in an atmospheric pressure due to the spread of the high-pressure water to the downstream side of the inner surface 131 can be suppressed. Therefore, the decrease in the impact pressure provided by the high-pressure water diagonally jetted toward the surface of the welded portion 97 can be suppressed, and the high-pressure water jetted through the jet nozzle 132 can be favorably jetted against the surface of the welded portion 97.

Further, according to the second embodiment, the screen 133 can be provided outside the jet region 120, and thus obstructing the high-pressure water jetted through the jet nozzle 132 toward the surface of the welded portion 97 by the screen 133 can be suppressed. Therefore, the high-pressure water jetted through the jet nozzle 132 can be favorably jetted against the surface of the welded portion 97, and the impact pressure can be favorably provided to the surface of the welded portion 97.

Further, according to the second embodiment, the screen 133 can be formed into the arc shape that surrounds the jet nozzle 132, and thus the space where the high-pressure water is kept can be formed. Therefore, the high-pressure water jetted against the surface of the welded portion 97 and flowing to the downstream side of the inner surface 131 can be favorably jet by the arc-shaped screen 133, and spread of the high-pressure water can be more favorably suppressed.

Further, according to the second embodiment, the screen 133 may be configured from a material having flexibility, and thus the screen 133 can be stuck to the inner surface 131 of the lower mirror 66. Further, even if the distance between the screen 133 and the inner surface 131 of the lower mirror 66 is displaced due to vibration generated by jetting of the high-pressure water, the screen 133 can be deformed following the displacement. Therefore, the high-pressure water jetted against the surface of the welded portion 97 and flowing to the downstream side of the inner surface 131 can be favorably kept by the screen 133, and the spread of the high-pressure water can be more favorably suppressed.

Further, according to the second embodiment, the rotation slide mechanism 134 is provided, so that the screen 133 can be rotated around the jet nozzle 132, and the screen 133 can be slid in the jet direction. Therefore, even when the jet nozzle 132 is moved along the welded portion 97, the screen 133 can be moved to a predetermined position that is a downstream side of the inner surface 131 where the high-pressure water spreads, following the movement of the jet nozzle 132.

Note that independent individual rotation mechanism and slide mechanism may be employed, in place of the rotation slide mechanism 134 of the second embodiment.

Figure 8:
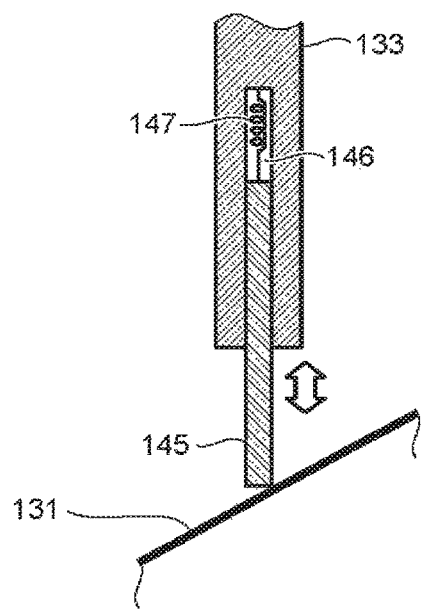
FIG. 8 is a schematic view illustrating a water jet peening device according to a modification of the second embodiment.

Further, the water jet peening device 130 of the second embodiment may be modified as illustrated in FIG. 8. FIG. 8 is a schematic view illustrating a water jet peening device according to a modification of the second embodiment. As illustrated in FIG. 8, a water jet peening device 130 of the modification is provided with a protruding member 145 that protrudes from a screen 133, at a tip side of the screen 133 (a side being in contact with the inner surface 131). The protruding member 145 is accommodated in an accommodation space 146 formed at the tip side of the screen 133. Further, the accommodation space 146 is provided with an elastic member 147, and the elastic member 147 energizes the screen 133 and the protruding member 145. Therefore, the protruding member 145 can displace a relative positional relationship with the screen 133. Therefore, even when the distance between the screen 133 and an inner surface 131 of a lower mirror 66 is displaced due to vibration generated by jetting high-pressure water, the protruding member 145 can be caused to appear and disappear from the screen 133, following the displacement. Therefore, the protruding member 145 can be favorably brought in contact with the inner surface 131 of the lower mirror 66.

Third Embodiment

Figure 9:
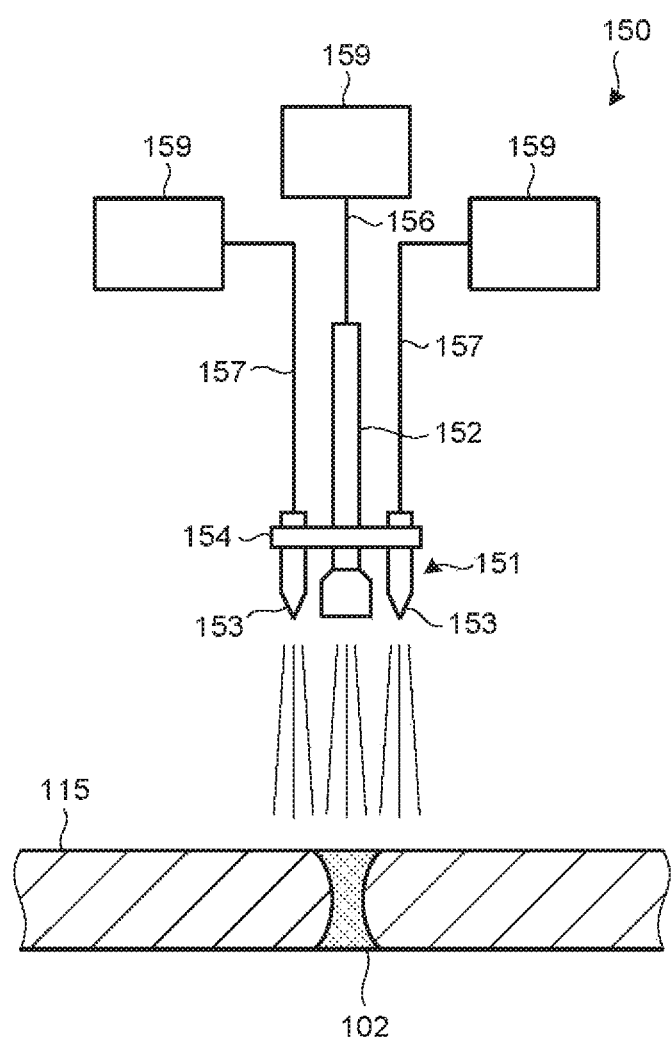
FIG. 9 is a schematic view illustrating a water jet peening device according to a third embodiment.
Figure 10:
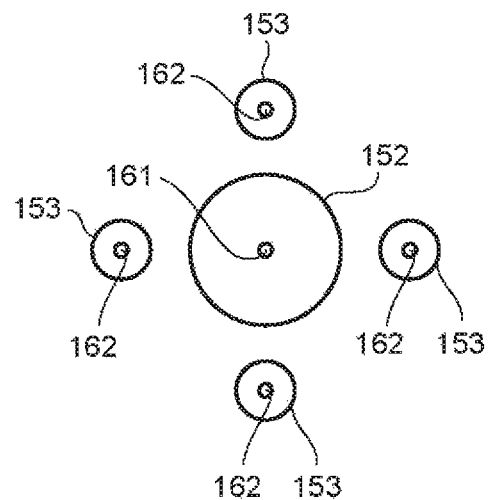
FIG. 10 is a plan view illustrating an arrangement relationship between a main jet nozzle and an auxiliary jet nozzle.
Figure 11:
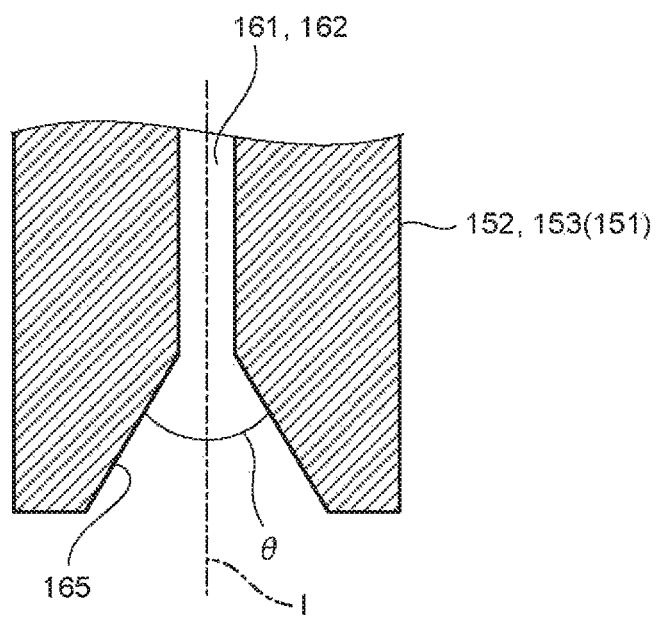
FIG. 11 is a sectional view in a nozzle tip side of each jet nozzle.

Next, a water jet peening device 150 according to a third embodiment will be described with reference to FIGS. 9 to 11. FIG. 9 is a schematic view illustrating a water jet peening device according to the third embodiment. FIG. 10 is a plan view illustrating an arrangement relationship between a main jet nozzle and an auxiliary jet nozzle. FIG. 11 is a sectional view in a nozzle tip side of each jet nozzle. In the third embodiment, to avoid overlapping description, portions different from those in the first and second embodiments will be described, and portions similar to those in the first and second embodiments are denoted with the same reference signs.

A water jet peening device 150 of the third embodiment makes an impact pressure to be provided to surfaces of welded portions 97 and 102 large by making an atmospheric pressure (a dynamic pressure of an atmosphere) outside cavitation bubbles large. The water jet peening device 150 of the third embodiment is mainly used to reform surfaces of the welded portions 102 between an inlet nozzle 67 and an outlet nozzle 68, and safe end pipes 101. The water jet peening device 150 of the third embodiment jets high-pressure water along the welded portion 102, similarly to the first embodiment.

As illustrated in FIG. 9, the water jet peening device 150 includes a jet nozzle 151 including a main jet nozzle 152 and a plurality of auxiliary jet nozzles 153, and a base plate 154 to which the main jet nozzle 152 and the plurality of auxiliary jet nozzles 153 are attached. The jet nozzle 151 is moved along the welded portion 102 by a moving mechanism (not illustrated). Here, the main jet nozzle 152 and the plurality of auxiliary jet nozzles 153 are separately formed jet nozzles.

Further, the water jet peening device 150 includes a main supply line 156 that supplies water to the main jet nozzle 152, and a plurality of auxiliary supply lines 157 that supplies the water to the plurality of auxiliary jet nozzles 153.

The main jet nozzle 152 jets the high-pressure water to create cavitation bubbles toward the welded portion 102. The high-pressure water jetted through the main jet nozzle 152 is jetted against the welded portion 102, and the cavitation bubbles collapse, so that the impact pressure is provided to the surface of the welded portion 102.

The plurality of auxiliary jet nozzles 153 is provided to surround a periphery of the main jet nozzle 152 centered at the main jet nozzle 152, and is arranged in a peripheral direction of the main jet nozzle 152 at predetermined intervals. As illustrated in FIG. 10, four auxiliary jet nozzles 153, for example, are provided around the main jet nozzle 152, by differentiating phases by 90°. The auxiliary jet nozzles 153 jet the high-pressure water to create cavitation bubbles toward the welded portion 102. The high-pressure water jetted through the plurality of auxiliary jet nozzles 153 is jetted against the welded portion 102 together with the high-pressure water jetted through the main jet nozzle 152, and the cavitation bubbles collapse, so that the impact pressure is provided to the surface of the welded portion 102.

The main jet nozzle 152 and the plurality of auxiliary jet nozzles 153 are attached to the base plate 154. Here, the main jet nozzle 152 and the plurality of auxiliary jet nozzles 153 attached to the base plate 154 are attached in parallel such that a jet direction of the high-pressure water jetted through the main jet nozzle 152, and jet directions of the high-pressure water jetted through the auxiliary jet nozzles 153 become the same direction.

The main supply line 156 connects the main jet nozzle 152 and a supply device 159 that pressure-feeds water, and supplies the water pressure-fed from the supply device 159 to the main jet nozzle 152. The plurality of auxiliary supply lines 157 connects the plurality of auxiliary jet nozzles 153 and plurality of supply devices 159, and supplies the water pressure-fed from the plurality of supply devices 159 toward the plurality of auxiliary jet nozzles 153. At this time, the supply device 159 connected to the main supply line 156 and the supply devices 159 connected to the plurality of auxiliary supply lines 157 are different individual supply devices 159. Further, the main supply line 156 and the auxiliary supply lines 157 are independent individual supply lines. Therefore, the water is pressure-fed from the independent individual supply line to the main jet nozzle 152 and the plurality of auxiliary jet nozzles 153, respectively.

At this time, a flow velocity of the high-pressure water jetted through the main jet nozzle 152 is faster than a flow velocity of the high-pressure water jetted through the auxiliary jet nozzle 153. In the third embodiment, the flow velocity of the high-pressure water through the main jet nozzle 152 has been faster than the flow velocity of the high-pressure water through the auxiliary jet nozzle 153. However, an embodiment is not limited to this configuration. The flow velocity of the high-pressure water jetted through the main jet nozzle 152 and the flow velocity of the high-pressure water jetted through the auxiliary jet nozzle 153 may be the same flow velocity, or the flow velocity of the high-pressure water through the auxiliary jet nozzle 153 may be faster than the flow velocity of the high-pressure water through the main jet nozzle 152.

Here, as illustrated in FIGS. 10 and 11, a cross section of a main jet hole 161 formed in a nozzle tip side of the main jet nozzle 152 is a circular opening, the cross section being obtained by cutting the main jet nozzle 152 by a plane perpendicular to the jet direction into which the high-pressure water is jetted. Further, a cross section of an auxiliary jet hole 162 formed in a nozzle tip side of the auxiliary jet nozzle 153 is a circular opening, the cross section being obtained by cutting the auxiliary jet nozzle 153 in a plane perpendicular to the jet direction into which the high-pressure water is jetted. At this time, an opening area of the main jet hole 161 of the main jet nozzle 152 may be larger than an opening area of the auxiliary jet hole 162 of the auxiliary jet nozzle 153, may be the same as the opening area of the auxiliary jet hole 162 of the auxiliary jet nozzle 153, or may be smaller than the opening area of the auxiliary jet hole 162 of the auxiliary jet nozzle 153.

Further, the nozzle tip side of the main jet hole 161 of the main jet nozzle 152 has a tapered shape where a tapered face 165 is formed. Further, the nozzle tip side of the auxiliary jet hole 162 of the auxiliary jet nozzle 153 has also a tapered shape where a tapered face 165 is formed, similarly to the main jet hole 161. The tapered face 165 is increased in a diameter toward the jet direction of the high-pressure water. A tapered angle θ of the tapered face 165, that is, an angle θ made by two bus-lines facing across a central axis I of the tapered face 165 is nearly 60°. Note that nearly 60° is an angle of 60°±2°.

In the water jet peening device 150 configured as described above, the high-pressure water is jetted through the main jet nozzle 152 and the plurality of auxiliary jet nozzles 153 toward the surface of the welded portion 102. The high-pressure water jetted through the main jet nozzle 152 has a high dynamic pressure of the atmosphere outside the cavitation bubbles created in the high-pressure water, due to addition of the high-pressure water jetted through the auxiliary jet nozzles 153. Then, the high-pressure water jetted through the main jet nozzle 152 and the auxiliary jet nozzles 153 is jetted against the surface of the welded portion 102, and the cavitation bubbles created in the high-pressure water collapse, so that the impact pressure is caused on the surface of the welded portion 102.

As described above, according to the third embodiment, the high-pressure water can be jetted through the main jet nozzle 152 and the auxiliary jet nozzles 153 toward the surface of the welded portion 102, and thus an atmospheric pressure (the dynamic pressure of the atmosphere) outside the cavitation bubbles created in the high-pressure water can be made large. Therefore, a pressure difference between the atmospheric pressure and an cavitation bubble internal pressure can be made large, and thus the impact pressure to be provided to the surface of the welded portion 102 by the high-pressure water jetted through the main jet nozzle 152 and the auxiliary jet nozzles 153 can be made large. Accordingly, the impact pressure due to collapse of the cavitation bubbles can be favorably provided to the surface of the welded portion 102, and thus a tensile residual stress on the surface of the welded portion 102 can be efficiently reformed to a compressive residual stress.

Further, according to the third embodiment, the flow velocity of the high-pressure water jetted through the main jet nozzle 152 can be made faster than the flow velocity of the high-pressure water jetted through the auxiliary jet nozzle 153. Therefore, the dynamic pressure of the high-pressure water jetted through the main jet nozzle 152 at a center side of the jet nozzle 151 can be made larger than a dynamic pressure of the high-pressure water jetted through the auxiliary jet nozzle 153 at an outer peripheral side of the jet nozzle 151.

Further, according to the third embodiment, the plurality of auxiliary jet nozzles 153 can be provided to surround the periphery of the main jet nozzle 152, and thus the high-pressure water jetted through the main jet nozzle 152 becoming deviated flow by the high-pressure water jetted through the auxiliary jet nozzle 153 can be suppressed. The number of the plurality of auxiliary jet nozzles 153 is favorably three or more, and is favorably provided around the main jet nozzle 152 in the peripheral direction of the main jet nozzle 152 at equal intervals.

Further, according to the third embodiment, the jet direction of the high-pressure water jetted through the auxiliary jet nozzle 153 can be made the same as the jet direction of the high-pressure water jetted through the main jet nozzle 152. Therefore, the high-pressure water jetted through the auxiliary jet nozzles 153 does not obstructs the high-pressure water jetted through the main jet nozzle 152 and does not decrease the dynamic pressure.

Further, according to the third embodiment, the main supply line 156 and the auxiliary supply line 157 are independent supply lines, so that the dynamic pressure of the high-pressure water jetted through the main jet nozzle 152 and the dynamic pressure of the high-pressure water jetted through the auxiliary jet nozzle 153 can be made high. Therefore, the dynamic pressures of the high-pressure water jetted through the main jet nozzle 152 and the auxiliary jet nozzles 153 toward the surface of the welded portion 102 can be further enhanced.

Further, according to the third embodiment, the opening area of the main jet hole 161 and the opening area of the auxiliary jet hole 162 can be the same cross sectional shape. At this time, the relationship of the size between the opening area of the main jet hole 161 and the opening area of the auxiliary jet hole 162 is caused to be a predetermined relationship, so that the high-pressure water jetted through the main jet hole 161 and the high-pressure water jetted through the auxiliary jet hole 162 can be favorably well-balanced, and thus the high-pressure water can be favorably jetted against the surface of the welded portion 102.

Further, according to the third embodiment, the nozzle tip side is formed into the tapered shape, so that the atmosphere around the nozzle tip of each jet nozzle 151 can be taken in, and the high-pressure water can be jetted through each jet nozzle 151. Therefore, the dynamic pressure of the high-pressure water jetted through each jet nozzle 151 can be made large.

Further, according to the third embodiment, the main jet nozzle 152 and the auxiliary jet nozzle 153 can be the separate nozzles, and thus the main jet nozzle 152 and the auxiliary jet nozzle 153 can be respectively treated. To be specific, the main jet nozzle 152 and the auxiliary jet nozzle 153 are made separate from each other, so that connection of the independent main supply line 156 and auxiliary supply line 157 can be made easy.

Fourth Embodiment

Figure 12:
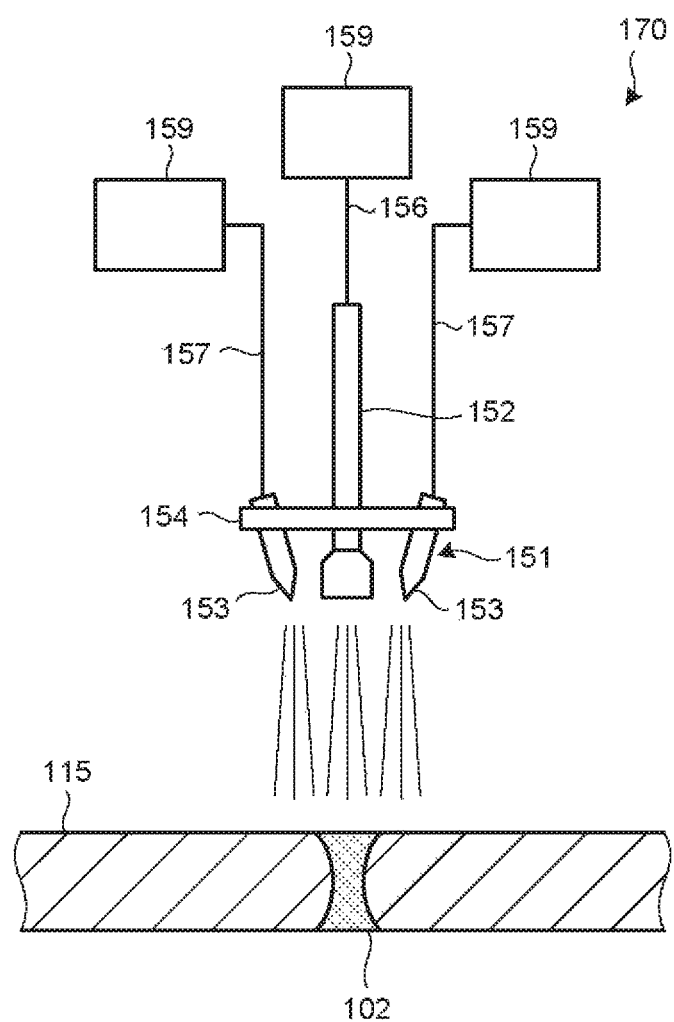
FIG. 12 is a schematic view illustrating a water jet peening device according to a fourth embodiment.

Next, a water jet peening device 170 according to a fourth embodiment will be described with reference to FIG. 12. FIG. 12 is a schematic view illustrating a water jet peening device according to the fourth embodiment. In the fourth embodiment, to avoid overlapping description, portions different from those in the first to third embodiments will be described, and portions similar to those in the first to third embodiments are denoted with the same reference signs.

The water jet peening device 170 of the fourth embodiment has a nearly similar structure to the water jet peening device 150 of the third embodiment. The water jet peening device 170 differentiates a jet direction of high-pressure water jetted through a main jet nozzle 152 and a jet direction of high-pressure water jetted through an auxiliary jet nozzle 153.

To be specific, the jet direction of the high-pressure water jetted through the auxiliary jet nozzle 153 is provided inclined to a side of the main jet nozzle 152 toward a surface of a welded portion 102. At this time, an angle made by the jet direction of the auxiliary jet nozzle 153 with respect to the jet direction of the main jet nozzle 152 is an angle at which the high-pressure water jetted through the auxiliary jet nozzle 153 does not obstruct the high-pressure water jetted through the main jet nozzle 152.

As described above, according to the fourth embodiment, the jet direction of the auxiliary jet nozzle 153 can be inclined to the main jet nozzle 152 side with respect to the jet direction of the main jet nozzle 152. Therefore, the high-pressure water jetted through the auxiliary jet nozzle 153 does not obstruct the high-pressure water jetted through the main jet nozzle 152, and the high-pressure water jetted through the auxiliary jet nozzle 153 can be favorably jetted against the surface of the welded portion 102.

Fifth Embodiment

Figure 13:
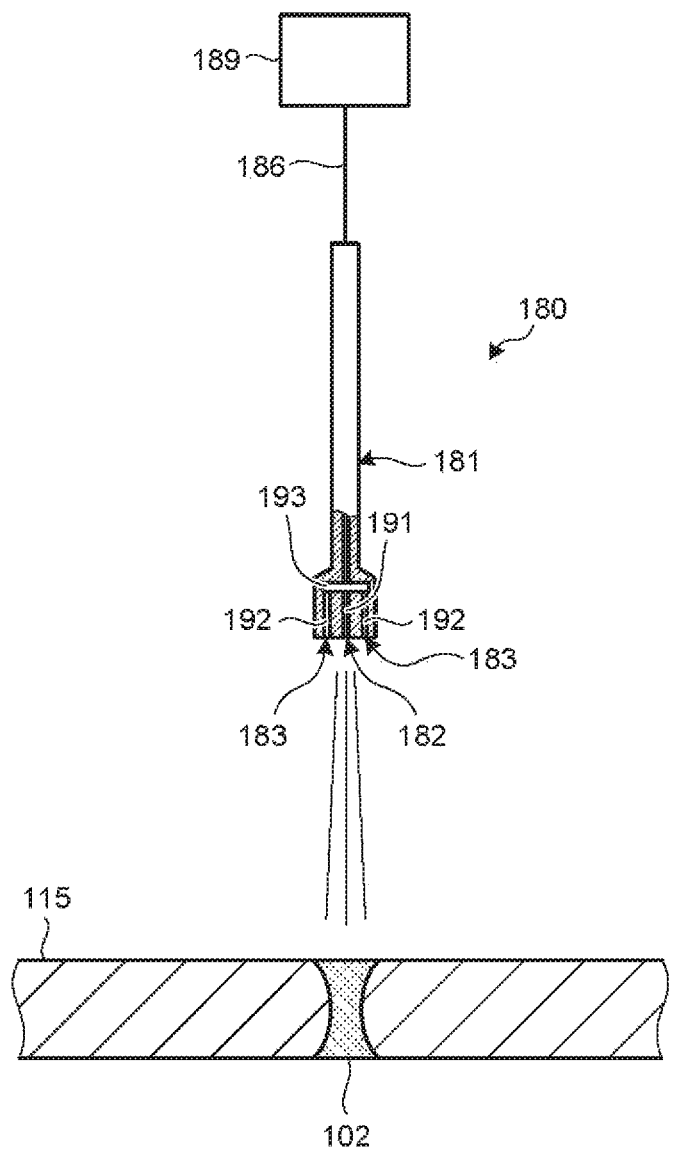
FIG. 13 is a schematic diagram illustrating a water jet peening device according to a fifth embodiment.
Figure 14:
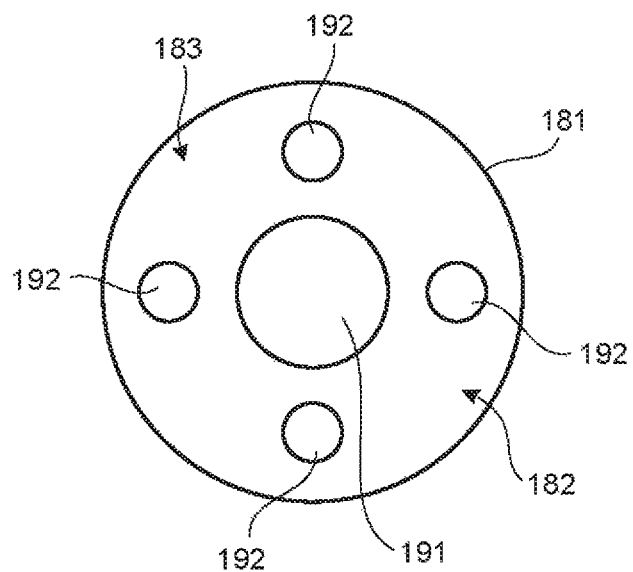
FIG. 14 is a plan view illustrating an arrangement relationship between a main jet nozzle and auxiliary jet nozzles according to the fifth embodiment.

Next, a water jet peening device 180 according to a fifth embodiment will be described with reference to FIGS. 13 and 14. FIG. 13 is a schematic diagram illustrating a water jet peening device according to the fifth embodiment. FIG. 14 is a plan view illustrating an arrangement relationship between a main jet nozzle and auxiliary jet nozzles according to the fifth embodiment. In the fifth embodiment, to avoid overlapping description, portions different from those in the first to fourth embodiments will be described, and portions similar to those in the first to fourth embodiments are denoted with the same reference signs.

The water jet peening device 180 of the fifth embodiment is used to reform surfaces of a welded portion 97 and welded portions 102. Note that, hereinafter, a case where the water jet peening device 180 of the fifth embodiment jets high-pressure water along the welded portion 102 will be described, similarly to the first, third, and fourth embodiments.

As illustrated in FIG. 13, the water jet peening device 180 includes a jet nozzle 181 including a main jet nozzle 182 and a plurality of auxiliary jet nozzles 183, and the jet nozzle 181 is moved along the welded portion 102 by a moving mechanism (not illustrated). Here, the main jet nozzle 182 and the plurality of auxiliary jet nozzles 183 are formed as an integrated jet nozzle 181. Further, the water jet peening device 180 includes a supply line 186 that supplies water to the jet nozzle 181.

In the jet nozzle 181, the main jet nozzle 182 is provided in the center, and the plurality of auxiliary jet nozzles 183 is integrally provided to surround a periphery of the main jet nozzle 182. Further, as illustrated in FIG. 14, in the jet nozzle 181, a main jet hole 191 of the main jet nozzle 182 is formed in a nozzle tip side, and a plurality of auxiliary jet holes 192 of the plurality of auxiliary jet nozzles 183 is formed. Then, in the jet nozzle 181, the main jet hole 191 is formed in the center, and the plurality of auxiliary jet holes 192 is formed to surround a periphery of the main jet hole 191.

As illustrated in FIG. 14, four auxiliary jet holes 192 are provided around the main jet hole 191 by differentiating phases by 90°. The main jet nozzle 182 of the jet nozzle 181 jets high-pressure water to create cavitation bubbles toward the welded portion 102 through the main jet hole 191, and the plurality of auxiliary jet nozzles 183 jets high-pressure water to create cavitation bubbles toward the welded portion 102 through the plurality of auxiliary jet holes 192. The high-pressure water jetted through the plurality of auxiliary jet holes 192 is jetted against the welded portion 102 together with the high-pressure water jetted through the main jet hole 191, and the cavitation bubbles collapse, so that an impact pressure is provided to the surface of the welded portion 102.

Further, in the jet nozzle 181, a manifold 193 into which the main jet hole 191 and the plurality of auxiliary jet holes 192 communicate into is formed, and the supply line 186 is connected to the manifold 193. Therefore, the manifold 193 branches the water supplied through the supply line 186 toward the main jet hole 191 and the plurality of auxiliary jet holes 192.

The supply line 186 connects the manifold 193 of the jet nozzle 181 and a supply device 189 that pressure-feeds the water, and supplies the water pressure-fed from the supply device 189 toward the jet nozzle 181. Therefore, the supply line 186 has a configuration that serves as a main supply line that supplies the water to the main jet nozzle 182 of the jet nozzle 181, and also serves as auxiliary supply lines that supply the water to the auxiliary jet nozzles 183 of the jet nozzle 181. Therefore, the water is pressure-fed from the same integrated supply line 186 to the main jet nozzle 182 and the plurality of auxiliary jet nozzles 183.

Here, as illustrated in FIG. 14, a cross section of the main jet hole 191 is a circular opening, the cross section being obtained by cutting the main jet hole 191 in a plane perpendicular to the jet direction into which the high-pressure water is jetted. Further, a cross section of the auxiliary jet hole 192 is a circular opening, the cross section being obtained by cutting the auxiliary jet hole 192 in a plane perpendicular to the jet direction into which the high-pressure water is jetted, similarly to the main jet hole 191. Note that an opening area of the main jet hole 191 and an opening area of the auxiliary jet hole 192 are similar to those in the third embodiment, and thus description is omitted. Further, a nozzle tip side of the main jet hole 191 and a nozzle tip side of the auxiliary jet hole 192 also have a tapered shape, similarly to those in the third embodiment, and thus description is omitted.

In the water jet peening device 180 configured as described above, the high-pressure water is jetted through the main jet hole 191 and the plurality of auxiliary jet holes 192 of the jet nozzle 181 toward the surface of the welded portion 102. A dynamic pressure of an atmosphere outside the cavitation bubbles created in the high-pressure water becomes high by addition of the high-pressure water jetted through the auxiliary jet holes 192 to the high-pressure water jetted through the main jet hole 191. Then, the high-pressure water jetted through the main jet hole 191 and the auxiliary jet holes 192 is jetted against the surface of the welded portion 102, and the cavitation bubbles created in the high-pressure water collapse, so that the impact pressure is caused on the surface of the welded portion 102.

As described above, according to the fifth embodiment, the high-pressure water can be jetted trough the main jet hole 191 of the jet nozzle 181 and the plurality of auxiliary jet holes 192 of the jet nozzle 181 toward the surface of the welded portion 102, and thus an atmospheric pressure (a dynamic pressure of an atmosphere) outside the cavitation bubbles created in the high-pressure water can be made large. Therefore, a pressure difference between the atmospheric pressure and a cavitation bubble internal pressure can be made large, and thus the impact pressure to be provided to the surface of the welded portion 102 by the high-pressure water jetted through the main jet hole 191 and the plurality of auxiliary jet holes 192 can be made large. Accordingly, the impact pressure due to collapse of the cavitation bubbles can be favorably provided to the surface of the welded portion 102, and thus a tensile residual stress on the surface of the welded portion 102 can be efficiently reformed to a compressive residual stress.

Further, according to the fifth embodiment, the plurality of auxiliary jet holes 192 can be provided to surround the periphery of the main jet hole 191, and thus the high-pressure water jetted through the main jet hole 191 becoming deviated flow by the high-pressure water jetted through the auxiliary jet holes 192 can be suppressed. Note that the number of the plurality of auxiliary jet holes 192 is favorably three or more, and in this case, the plurality of auxiliary jet holes 192 is favorably provided around the main jet hole 191 in a peripheral direction of the main jet hole 191 at equal intervals.

Further, according to the fifth embodiment, the main supply line and the auxiliary supply lines are the same integrated supply line 186, so that the configuration around the supply line 186 can be simplified, and the water jet peening device 180 can be made compact.

Further, according to the fifth embodiment, the main jet nozzle 182 and the auxiliary jet nozzles 183 can be the integrated jet nozzle 181, and thus the configuration of the jet nozzle 181 can be simplified, and the jet nozzle 181 can be made compact.

Note that, in the fifth embodiment, the jet direction of the high-pressure water jetted through the auxiliary jet hole 192 may be made the same as the jet direction of the high-pressure water jetted through the main jet hole 191, or may be a direction inclined to the main jet hole 191 side.

Figure 15:
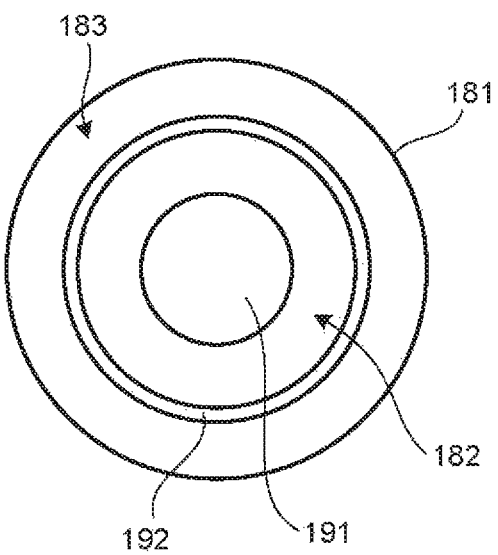
FIG. 15 is a plan view illustrating an example of an arrangement relationship between a main jet nozzle and an auxiliary jet nozzle.

Further, in the fifth embodiment, the main jet hole 191 as the circular opening has been formed in the center of the jet nozzle 181 and the plurality of auxiliary jet holes 192 as the circular openings has been formed in the periphery of the main jet hole 191. However, a configuration illustrated in FIG. 15 may be employed. FIG. 15 is a plan view illustrating an example of an arrangement relationship between a main jet nozzle and an auxiliary jet nozzle. As Illustrated in FIG. 15, the main jet hole 191 as a circular opening is formed in the center of the jet nozzle 181, and the auxiliary jet hole 192 as an annular-shaped opening may be formed to surround a periphery of the main jet hole 191.

Figure 16:
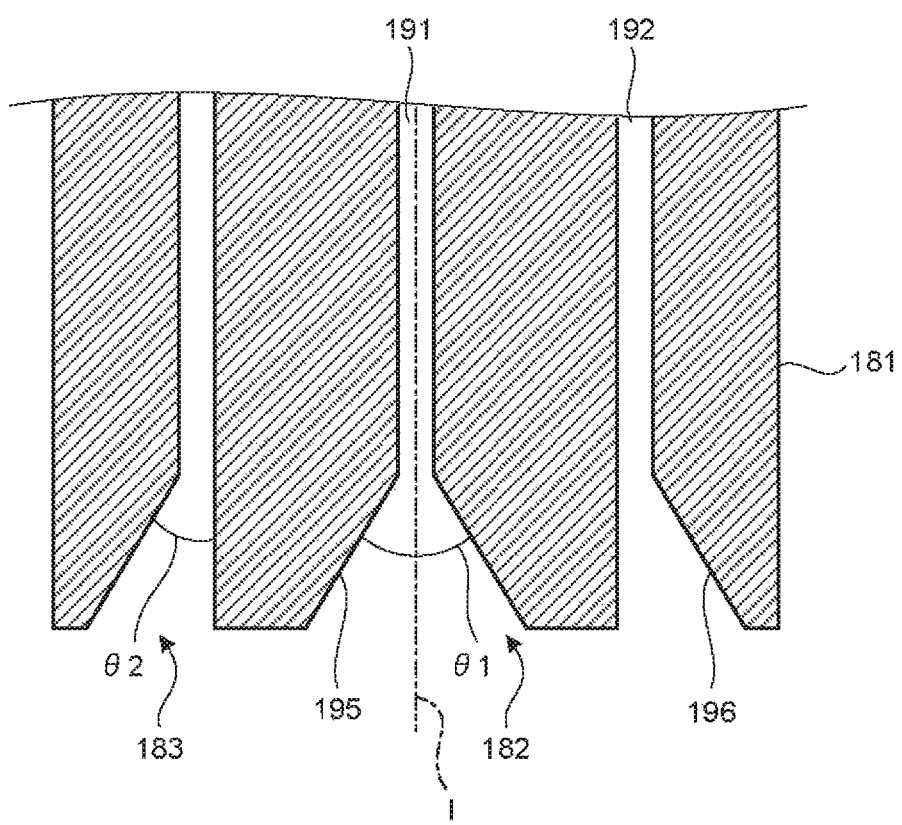
FIG. 16 is a sectional view of a main jet nozzle and an auxiliary jet nozzle at a nozzle tip side.

At this time, shapes of nozzle tips of the main jet hole 191 and the auxiliary jet hole 192 are shapes illustrated in FIG. 16. FIG. 16 is a sectional view of a main jet nozzle and an auxiliary jet nozzle at a nozzle tip side. As illustrated in FIG. 16, a nozzle tip side of the main jet hole 191 has a tapered shape where a tapered face 195 is formed around a central axis I, similarly to the third embodiment. Meanwhile, a nozzle tip side of the auxiliary jet hole 192 as the annular-shaped opening has a tapered shape where a tapered face 196 is formed around the central axis I, where, while an inner-side (the main jet hole 191-side) peripheral surface has a straight shape with the same diameter toward the jet direction of the high-pressure water, an outer-side peripheral surface becomes large in the diameter toward the jet direction of the high-pressure water.

A tapered angle $\theta 1$ of the tapered face 195 of the main jet hole 191 is nearly 60°, similarly to the third embodiment. Meanwhile, a tapered angle $\theta 2$ of the tapered face 196 of the auxiliary jet hole 192 is half the angle $\theta 1$, that is, nearly 30° (30°±1°). Here, the tapered angle $\theta 2$ is an angle made by a bus-line of the tapered face 196 as the outer-side peripheral surface and a bus-line of the inner-side peripheral surface, which face each other in a radial direction. That is, the tapered angle $\theta 2$ of the tapered face 196 of the auxiliary jet hole 192 is smaller than the tapered angle $\theta 1$ of the tapered face 195 of the main jet hole 191.

According to this configuration, the outer-side peripheral surface is formed into the tapered shape at the nozzle tip side of the auxiliary jet hole 192, so that the atmosphere around the nozzle tip at the outer peripheral side of the auxiliary jet hole 192 is taken in, and the high-pressure water can be jetted through the auxiliary jet hole 192. Therefore, the dynamic pressure of the high-pressure water jetted through the auxiliary jet hole 192 can be made large. Meanwhile, the inner-side peripheral surface is formed into the straight shape at the nozzle tip side of the auxiliary jet hole 192, so that taking-in of the atmosphere can be suppressed at the inner peripheral side of the auxiliary jet hole 192, and thus interference with the high-pressure water jetted through the main jet hole 191 can be suppressed.

Note that the first to fifth embodiments can be appropriately combined. For example, the jet nozzles 151 and 181 of the third to fifth embodiments may be used as the jet nozzle 112 of the first embodiment, or may be used as the jet nozzle 132 of the second embodiment.

REFERENCE SIGNS LIST

1 ATOMIC POWER PLANT
11 CONTAINMENT
12 PRESSURIZED WATER NUCLEAR REACTOR
13 STEAM GENERATOR
14 HIGH TEMPERATURE-SIDE FEED PIPE
15 LOW TEMPERATURE-SIDE FEED PIPE
16 PRESSURIZER
17 PRIMARY COOLING WATER PUMP
31 PIPE
32 STEAM TURBINE
36 POWER GENERATOR
41 STEAM CONDENSER
44 WATER INTAKE PIPE
45 DRAIN PIPE
46 CIRCULATING WATER PUMP
47 PIPE
54 WATER FEED PUMP
61 NUCLEAR REACTOR VESSEL
62 NUCLEAR REACTOR VESSEL BODY
63 NUCLEAR REACTOR VESSEL COVER (UPPER MIRROR)
64 STATVOLT
65 NUT
66 LOWER MIRROR
67 INLET NOZZLE
68 OUTLET NOZZLE
69 UPPER CORE SUPPORT
70 LOWER CORE SUPPORT
71 REACTOR INTERNAL SUPPORT ROD
72 UPPER CORE PLATE
73 CORE BARREL
74 LOWER CORE SUPPORT PLATE
75 REACTOR INTERNAL
76 FUEL ASSEMBLY
77 CONTROL ROD
78 CONTROL ROD CLUSTER
79 CONTROL ROD CLUSTER GUIDE PIPE
80 CONTROL ROD DRIVING MECHANISM
81 HOUSING
82 CONTROL ROD CLUSTER DRIVE SHAFT
83 INSTRUMENTATION NOZZLE
84 IN-CORE INSTRUMENTATION GUIDE PIPE
85 CONDUIT TUBE
86, 87 CONNECTION PLATE
88 THIMBLE TUBE
89 UPPER PLENUM
90 LOWER PLENUM
91 DOWNCOMER SECTION
95 IN-CORE INSTRUMENTATION TUBE
96 ATTACHING HOLE
97 WELDED PORTION
101 SAFE END PIPE
102 WELDED PORTION
110 WATER JET PEENING DEVICE
111 SEALED VESSEL
112 JET NOZZLE
113 PRESSURE CONTROL HOLE
115 NOZZLE PERIPHERAL SURFACE
116 VESSEL BODY
117 SEAL MEMBER
120 JET REGION
130 WATER JET PEENING DEVICE (SECOND EMBODIMENT)
131 INNER SURFACE
132 JET NOZZLE
133 SCREEN
134 ROTATION SLIDE MECHANISM
141 CYLINDER MEMBER
142 STAY MEMBER
145 PROTRUDING MEMBER
146 ACCOMMODATION SPACE
147 ELASTIC MEMBER
150 WATER JET PEENING DEVICE (THIRD EMBODIMENT)
151 JET NOZZLE
152 MAIN JET NOZZLE
153 AUXILIARY JET NOZZLE
154 BASE PLATE
156 MAIN SUPPLY LINE
157 AUXILIARY SUPPLY LINE
159 SUPPLY DEVICE
161 MAIN JET HOLE
162 AUXILIARY JET HOLE
165 TAPERED FACE
170 WATER JET PEENING DEVICE (FOURTH EMBODIMENT)
180 WATER JET PEENING DEVICE (FIFTH EMBODIMENT)
181 JET NOZZLE
182 MAIN JET NOZZLE
183 AUXILIARY JET NOZZLE
186 SUPPLY LINE
189 SUPPLY DEVICE
191 MAIN JET HOLE
192 AUXILIARY JET HOLE
193 MANIFOLD
195 TAPERED FACE
196 TAPERED FACE
I CENTRAL AXIS

The invention claimed is:
1. A water jet peening device comprising:
a jet nozzle adapted to jet a high-pressure fluid to create a cavitation bubble toward a surface to be executed; and
a screen arranged in a periphery of the jet nozzle, wherein
the jet nozzle diagonally jets the fluid against the surface to be executed, and
the screen is arranged on the surface to be executed, the surface to be executed being positioned at a downstream side in a flow direction of the fluid jetted against and flowing on the surface to be executed, wherein the screen is formed into an arc shape that surrounds the jet nozzle.

2. The water jet peening device according to claim 1, wherein the screen is provided outside a jet region where an impact pressure is generated by the fluid jetted through the jet nozzle, on the surface to be executed.

3. The water jet peening device according to claim 1, wherein
the screen is configured from a material having flexibility.

4. The water jet peening device according to claim 1, further comprising:
a slide mechanism adapted to relatively slide the screen with respect to the jet nozzle in a jet direction of the fluid jetted through the jet nozzle.

5. The water jet peening device according to claim 1, further comprising:
a sealed vessel accommodating the jet nozzle inside, provided to cover the surface to be executed, and adapted to be in a sealed state where an internal pressure is higher than an outside; and
a pressure control section adapted to be able to adjust the internal pressure of the sealed vessel.

6. The water jet peening device according to claim 1, wherein
the jet nozzle includes
a main jet nozzle adapted to jet the high-pressure fluid to create a cavitation bubble toward the surface to be executed, and
an auxiliary jet nozzle provided in a periphery of the main jet nozzle, and adapted to jet the high-pressure fluid to create a cavitation bubble toward the surface to be executed.

7. The water jet peening device according to claim 1, further comprising: a plurality of jet nozzles.

8. A water jet peening device comprising:
a jet nozzle adapted to jet a high-pressure fluid to create a cavitation bubble toward a surface to be executed;
a screen arranged in a periphery of the jet nozzle; and
a rotation mechanism adapted to relatively rotate the screen centered at the jet nozzle, wherein
the jet nozzle diagonally jets the fluid against the surface to be executed, and
the screen is arranged on the surface to be executed, the surface to be executed being positioned at a downstream side in a flow direction of the fluid jetted against and flowing on the surface to be executed.

9. The water jet peening device according to claim 8, further comprising: a plurality of jet nozzles.

10. The water jet peening device according to claim 8, wherein the jet nozzle includes
a main jet nozzle adapted to jet the high-pressure fluid to create a cavitation bubble toward the surface to be executed, and
an auxiliary jet nozzle provided in a periphery of the main jet nozzle, and adapted to jet the high-pressure fluid to create a cavitation bubble toward the surface to be executed.

* * * * *